United States Patent
Irwin et al.

(10) Patent No.: US 11,971,114 B1
(45) Date of Patent: Apr. 30, 2024

(54) SOLENOID ADAPTER

(71) Applicant: Rain Bird Corporation, Azusa, CA (US)

(72) Inventors: Kevin Mark Irwin, Tucson, AZ (US); Kevin James Markley, Tucson, AZ (US); Nicholas James Watts, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 18/151,314

(22) Filed: Jan. 6, 2023

(51) Int. Cl.
*F16K 31/06* (2006.01)
*F16K 1/36* (2006.01)

(52) U.S. Cl.
CPC ............ *F16K 31/0658* (2013.01); *F16K 1/36* (2013.01)

(58) Field of Classification Search
CPC ........ F16K 31/0658; F16K 1/36; F16K 31/12; F16K 7/17; F16K 31/0672; F16K 31/385; F16K 31/40; F16K 31/402
USPC ................................ 251/30.04, 30.02, 30.01
See application file for complete search history.

(56) References Cited

U.S. PATENT DOCUMENTS

| | | | |
|---|---|---|---|
| 802,948 A | 10/1905 | Waterman | |
| 1,765,377 A | 6/1930 | Donn | |
| 3,124,157 A | 3/1964 | Thomas | |
| 3,410,301 A | 11/1968 | Merriner | |
| 4,662,397 A | 5/1987 | Callison | |
| 5,810,533 A | 9/1998 | Nakamura | |
| 5,853,026 A | 12/1998 | Wlodarczyk | |
| 6,263,901 B1 * | 7/2001 | Lohde | F16K 31/402 251/30.02 |
| 6,394,126 B2 | 5/2002 | Lohde | |
| 6,394,413 B2 | 5/2002 | Lohde | |
| 6,488,260 B1 | 12/2002 | Dietz | |
| 6,557,580 B2 | 5/2003 | Lohde | |
| 6,684,901 B1 | 2/2004 | Cahill | |
| 6,877,714 B2 * | 4/2005 | Hall | F16K 31/406 251/30.02 |
| 6,974,120 B2 | 12/2005 | Wilson | |

(Continued)

OTHER PUBLICATIONS

Rain Bird Corporation, Adapter 1 publicly available more than a year before the filing date.

(Continued)

*Primary Examiner* — Kelsey E Cary
(74) *Attorney, Agent, or Firm* — Fitch, Even, Tabin & Flannery, LLP

(57) ABSTRACT

A solenoid adapter for a solenoid valve that permits use of different solenoids with different solenoid bowls is provided. Specifically, a reverse flow solenoid adapter enables use of a reverse flow solenoid with a forward flow solenoid bowl, while a forward flow solenoid adapter enables use of a forward flow solenoid with a reverse flow solenoid bowl. The adapters include a lower section to mount into a valve solenoid bowl, an upper portion including an adapter solenoid chamber to receive a solenoid, and flow-reversing passages that duct a vent passage flow path from the valve solenoid bowl to the adapter solenoid chamber such that the flow path transitions from a flow configuration of the valve solenoid bowl to a flow configuration required for the solenoid to function and returns to the flow configuration of the valve solenoid bowl as the path circulates back to the valve solenoid bowl.

22 Claims, 21 Drawing Sheets

(56) References Cited

U.S. PATENT DOCUMENTS

| | | |
|---|---|---|
| 7,694,934 B2 | 4/2010 | Irwin |
| 7,735,513 B2 | 6/2010 | Bush |
| 7,938,383 B2 | 5/2011 | Zur |
| 8,261,770 B2 | 9/2012 | Bush |
| 8,397,745 B2 | 3/2013 | Hurst |
| 8,413,681 B2 | 4/2013 | Schmuckle |
| 8,695,620 B2 | 4/2014 | Bush |
| 8,740,177 B2 | 6/2014 | Walker |
| 8,881,759 B1 | 11/2014 | Shtekelmacher |
| 10,088,849 B2 | 10/2018 | Hurst |
| 10,815,958 B2 | 10/2020 | Kah, III |
| 11,578,812 B2 | 2/2023 | Busch |
| 11,721,465 B2 | 8/2023 | Tresso |
| 11,796,071 B2 | 10/2023 | Niess |
| 11,797,032 B2 | 10/2023 | Shah |
| 2001/0039962 A1* | 11/2001 | Lohde ............... F16K 31/402 137/315.01 |
| 2008/0029722 A1* | 2/2008 | Irwin ............... F16K 47/023 251/45 |
| 2009/0283166 A1 | 11/2009 | Gott |
| 2018/0320792 A1 | 11/2018 | Ross |
| 2019/0242355 A1* | 8/2019 | Kah, III ............ F16K 31/402 |
| 2020/0200290 A1 | 6/2020 | Busch |

OTHER PUBLICATIONS

Rain Bird Corporation, Adapter 2 publicly available more than a year before the filing date.

Toro, "Toro Illustrated Parts Breakout Book, Form No. 380-0070 Rev E," 2015, The Toro Company, Bloomington, Minnesota. Retrieved from the Internet <https://cdn2.toro.com/en/-/media/Files/Toro/Page/Parts/irrigation-parts-breakout-book.ashx>, Cover pages, Contents pages, and Valve Product Drawings showing combination of Valve Handle (Part Nos. (1081051 and 606902) and Bleed Plug (Part Nos. 1025593, 1021197, and 1024787) for ten valves, 26 pages.

USPTO; U.S. Appl. No. 16/723,684; Office Action dated Jul. 7, 2021; (pp. 1-7).

USPTO; U.S. Appl. No. 16/723,684; Final Rejection dated Jan. 4, 2022; (pp. 1-6).

USPTO; U.S. Appl. No. 16/723,684; Notice of Allowance and Fees Due (PTOL-85) dated Jan. 17, 2023; (pp. 1-2).

USPTO; U.S. Appl. No. 16/723,684; Notice of Allowance and Fees Due (PTOL-85) dated Apr. 20, 2022; (pp. 1-9).

USPTO; U.S. Appl. No. 16/723,684; Notice of Allowance and Fees Due (PTOL-85) dated Jul. 18, 2022; (pp. 1-9).

USPTO; U.S. Appl. No. 16/723,684; Notice of Allowance and Fees Due (PTOL-85) dated Dec. 5, 2022; (pp. 1-10).

\* cited by examiner

SOLENOID ADAPTER

FIELD

The present invention relates to solenoid valves and, more particularly, to adapters for enabling use of different solenoids with different solenoid valves.

BACKGROUND

Solenoid valves are commonly used to control fluid flow through a fluid system, such as an irrigation system. A typical solenoid valve includes an inlet, an outlet, and a valve seat between them. A diaphragm engages the valve seat to prevent flow through the valve and is moved off the valve seat to permit flow through the valve. A pressure chamber is located on the side of the diaphragm opposite the valve seat. Fluid from the inlet side of the valve seat flows into the pressure chamber, such as through a port in the diaphragm. The fluid builds up in the pressure chamber causing the diaphragm to close against the valve seat. To open the valve, the solenoid is energized to open a vent passage from the pressure chamber to the outlet side of the valve seat to release fluid pressure in the pressure chamber so that the inlet pressure of the fluid can raise the diaphragm off the valve seat. To close the valve, the solenoid is deenergized so that the pressure chamber can become pressurized to overcome the inlet pressure, forcing the diaphragm onto the valve seat.

A solenoid is typically mounted to a solenoid valve via a solenoid bowl on the valve adjacent to the pressure chamber. When fluid is vented from the pressure chamber, the fluid travels a vent passage flow path that passes through the solenoid bowl. Generally, the flow path passes from the pressure chamber through an entrance opening of the solenoid bowl into the bowl, and then passes out of the solenoid bowl through an exit opening of the bowl to the outlet side of the valve seat.

The vent passage flow path through the solenoid bowl can have different configurations depending on the type of solenoid bowl or valve. For instance, "reverse flow" solenoid bowls and "forward flow" solenoid bowls are known, which have configurations and flow paths which are opposite in certain respects to one another. The different configurations and flow paths of reverse flow solenoid bowls and forward flow solenoid bowls yield different fluid dynamics in the bowl during operation of the solenoid. Because of these differences, solenoids have different design features enabling them to function properly in either a reverse flow or forward flow configuration. As such, some solenoids can be considered reverse flow solenoids, designed to work with reverse flow solenoid bowls, and some solenoids can be considered forward flow solenoids, designed to work with forward flow solenoid bowls.

Not only do the flow passages vary between the different types of solenoid bowl, but solenoid bowls may have other varying parameters such as the diameter of the bowl or the pitch of the threads. Such parameters can vary, for example, depending on the type of valve or between manufacturers.

Generally, a reverse flow solenoid can only be used with a reverse flow solenoid bowl, and a forward flow solenoid can only be used with a forward flow solenoid bowl. Thus, for example, an irrigation valve that has a forward flow solenoid bowl can only accommodate a forward flow solenoid and cannot accommodate a reverse flow solenoid. This inflexibility is disadvantageous if a valve requires a type of solenoid that is, for instance, not readily available or too costly in comparison to the other type of solenoid. Thus, there is a desire for solenoid adapters that enable different solenoids to be used with different solenoid bowls.

DETAILED DESCRIPTION

Figure 1A:
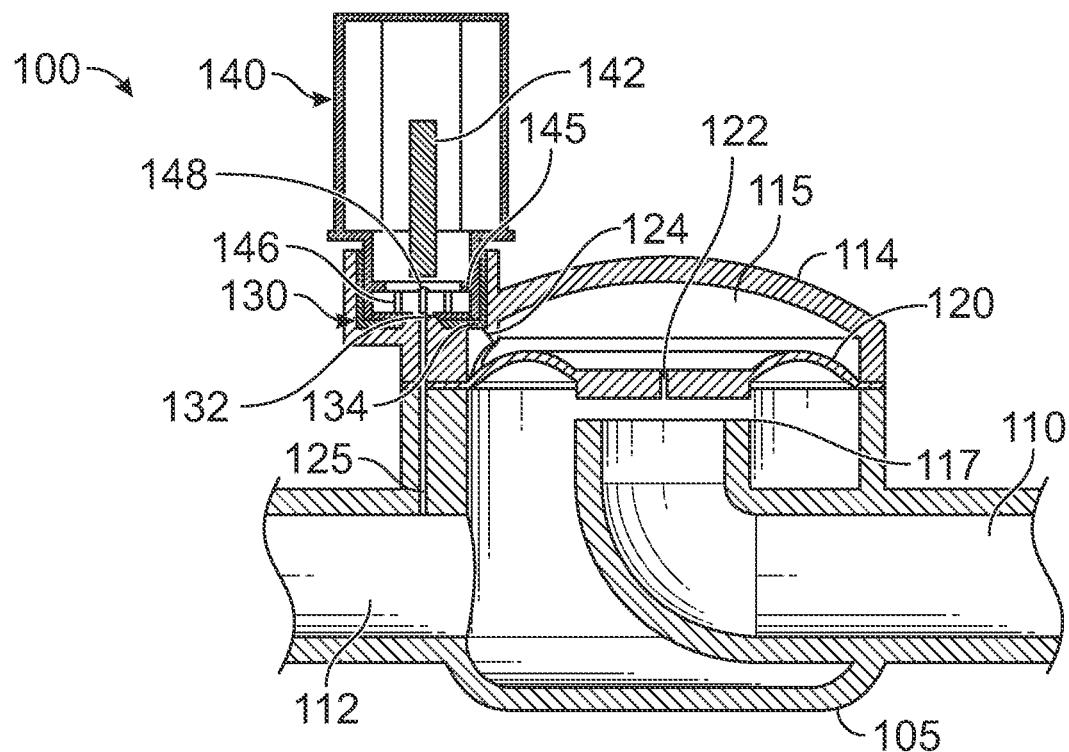
FIG. 1A is a centrally taken cross-section view of a solenoid valve having a reverse flow solenoid/solenoid-bowl configuration in an open position.
Figure 1B:
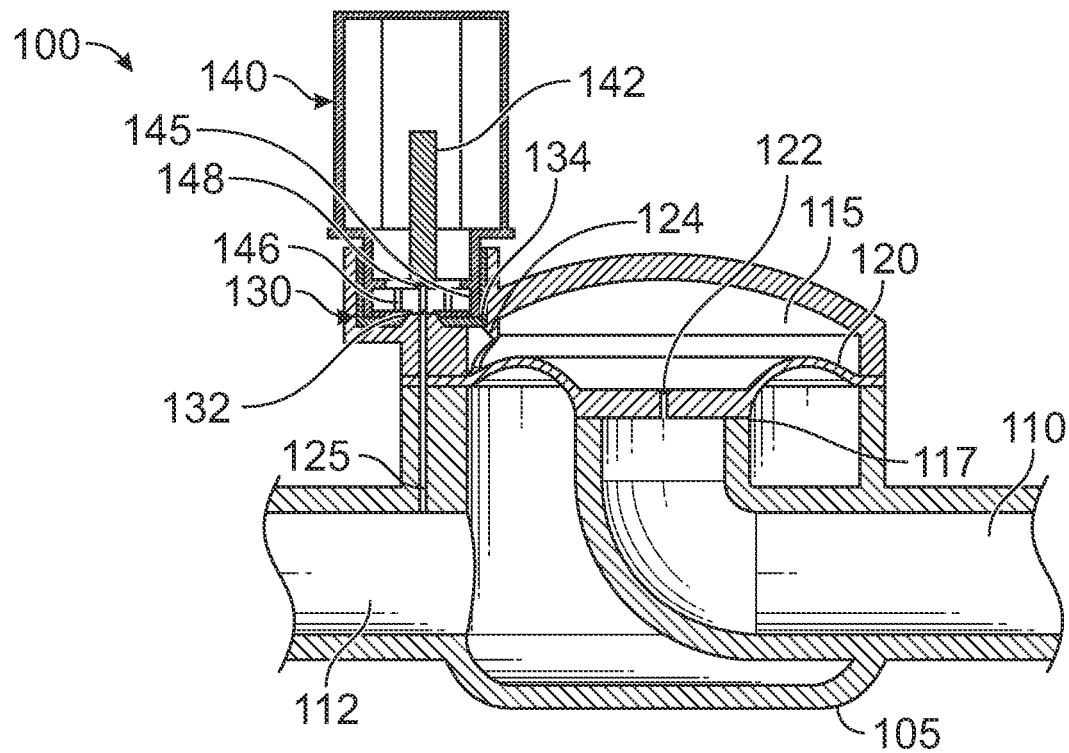
FIG. 1B is a centrally taken cross-section view of a solenoid valve having a reverse flow solenoid/solenoid bowl configuration in a closed position.

With reference to FIGS. 1A-1B, there is illustrated a solenoid valve 100. FIG. 1A illustrates the valve 100 in an open position and FIG. 1B illustrates the valve 100 in a closed position. The solenoid valve includes a valve body 105 and a bonnet 114. The valve body 105 includes an inlet 110, an outlet 112, a primary valve seat 117 between the inlet 110 and outlet 112 and a diaphragm 120 that engages the primary valve seat 117 to prevent flow (as illustrated in FIG. 1B) and that lifts off the primary valve seat 117 to allow flow (as illustrated in FIG. 1A). The bonnet 114 and the diaphragm 120 form a pressure chamber or control chamber 115, and the diaphragm 120 includes a passage 122 for fluid to pass from the inlet side of the diaphragm 120 to fill the pressure chamber 115. When the pressure chamber 115 fills with fluid and the fluid is prevented from exiting the chamber downstream, i.e., from venting, the pressure in the chamber forces the diaphragm onto the valve seat 117 to close the valve. When the pressure chamber 115 is permitted to vent, the pressure in the chamber is reduced, allowing the pressure pushing up from the inlet 110 to lift the diaphragm 120 off the valve seat 117 to open the valve.

The bonnet 114 includes a solenoid bowl 130 to attach a solenoid 140 to the solenoid valve 100. The solenoid bowl 130 includes internal threading that mates with external threading on the solenoid 140 to mount the solenoid 140. The solenoid 140 controls the opening and closing of the valve 100 by either permitting or preventing venting of the pressure chamber 115. To this end, a vent passage flow path exists between the pressure chamber 115 and the outlet 112 of the valve 110. Fluid from the pressure chamber is vented by flowing through a pressure chamber vent passage 124 into the solenoid bowl 130, and then out the solenoid bowl 130 to the outlet 112 side of the valve 100 via a downstream vent passage 125. The solenoid 140 permits or prevents the venting of the fluid from the solenoid bowl 130 when a plunger 142 of the solenoid 140 opens and closes a secondary valve seat (in this case a central bleed port 148 of a solenoid retainer 145) along the vent passage flow path.

In the closed position, the plunger 142 is in engagement with the secondary valve seat (i.e., the retainer bleed port 148) and pressure increases in the pressure chamber 115 to force the diaphragm 120 into engagement with the primary valve seat 117 to close the valve 100. In the open position, the plunger 142 is spaced from the secondary valve seat (i.e., retainer bleed port 148) and fluid flows from the pressure chamber 115 to the outlet 112, thereby relieving pressure in the pressure chamber 115 and allowing the pressure of the inlet fluid to move the diaphragm 120 off the primary valve seat 117 to permit flow through the valve 100.

The vent passage flow path can have different configurations in different solenoid valves. Generally, the vent passage flow path passes from the pressure chamber through an entrance opening of the solenoid bowl into the bowl, and then passes out of the solenoid bowl through an exit opening of the bowl to the outlet side of the valve seat. However, the vent passage flow path through the solenoid bowl may vary. For instance, in certain types of solenoid valve, either the entrance opening or the exit opening of the solenoid bowl (or a corresponding entrance or exit opening of a solenoid retainer) functions as the secondary valve seat for the vent passage flow path, which is opened or closed by the axially central plunger of the solenoid to permit or inhibit venting of the fluid. Whether the entrance opening or the exit opening of the solenoid bowl (or a corresponding entrance or exit opening of a solenoid retainer) functions as the secondary valve seat depends on the positioning of the entrance and exit openings. In order to function as the secondary valve seat, the entrance or exit opening must be centrally positioned in the solenoid bowl so as to be aligned with the axially central plunger of the solenoid to engage the plunger when it is lowered.

Figure 2A:
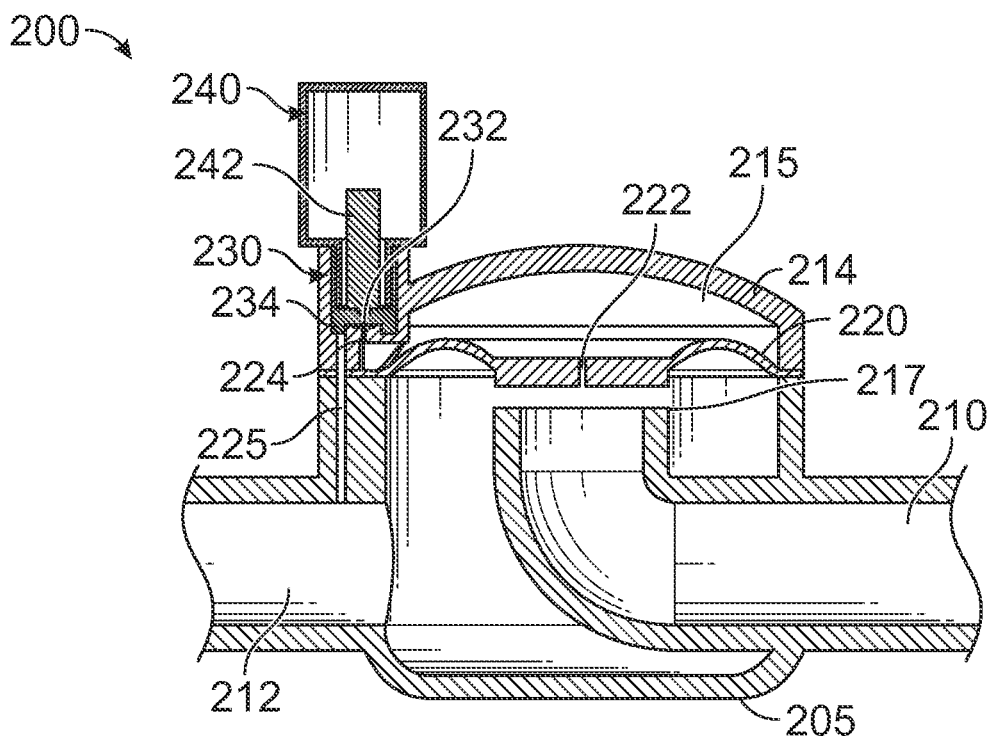
FIG. 2A is a centrally taken cross-section view of a solenoid valve having a forward flow solenoid/solenoid-bowl configuration in an open position.
Figure 2B:
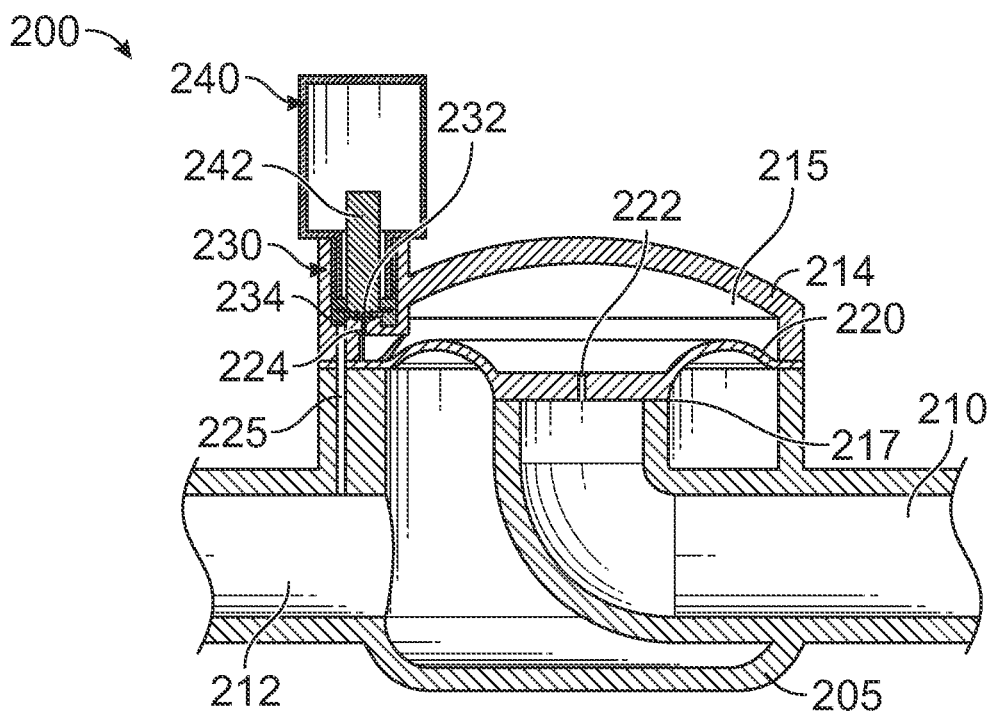
FIG. 2B is a centrally taken cross-section view of a solenoid valve having a forward flow solenoid/solenoid-bowl configuration in a closed position.
Figure 3A:
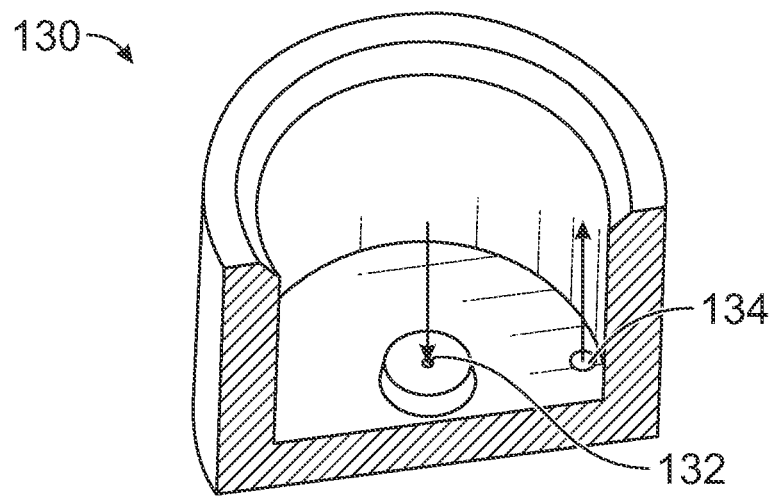
FIG. 3A is a diagrammatic view of a flow path of fluid through a reverse flow solenoid bowl.
Figure 3B:
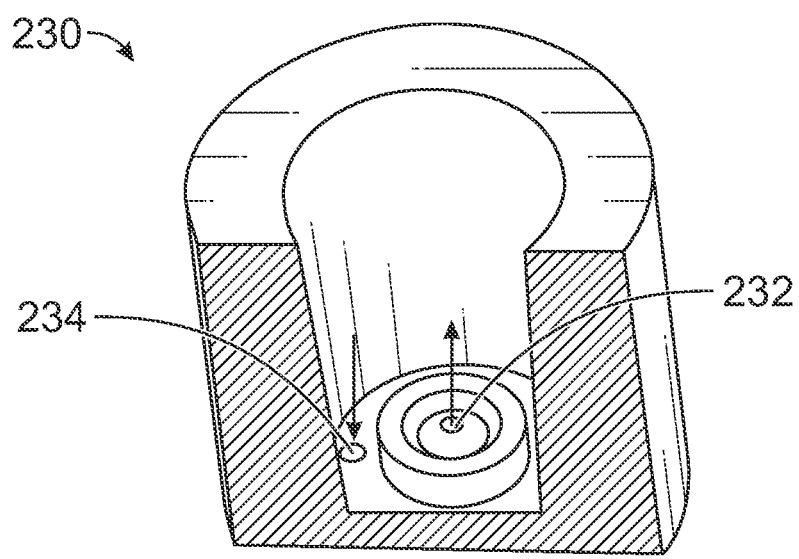
FIG. 3B is a diagrammatic view of a flow path of fluid through a forward flow solenoid bowl.

Depending on the positions of the entrance and exit openings, solenoid bowls may have a "reverse flow" configuration or a "forward flow" configuration. FIGS. 1A-1B illustrate a solenoid valve 100 having a reverse flow solenoid bowl 130 and a corresponding reverse flow solenoid 140, while FIGS. 2A-2B illustrate a solenoid valve 200 having a forward flow solenoid bowl 230 and a corresponding forward flow solenoid 240. FIGS. 3A-3B also diagrammatically illustrate the different flow paths through a reverse flow solenoid bowl 130 and a forward flow solenoid bowl 230.

With reference to FIGS. 2A-2B and 3B, in a "forward flow" configuration, the entrance opening 232 of the solenoid bowl is positioned at the center of the solenoid bowl 230, aligned with the axially central plunger 242 of the solenoid 240, and the exit opening 234 is positioned radially outwards from center. In such a configuration, the entrance opening 232 constitutes the secondary valve seat of the vent passage flow path. Thus, when the solenoid 240 is deenergized, the axially central plunger 242 of the solenoid 240 blocks the centrally positioned entrance opening 232 of the solenoid bowl 230, preventing the pressure chamber fluid from flowing from the pressure chamber vent passage 224 into the solenoid bowl 230, and thereby inhibiting venting of the pressure chamber 215. When the solenoid is energized, the plunger 242 is lifted off the centrally positioned entrance opening 232, permitting the pressure chamber fluid to flow through the entrance opening 232 into the solenoid bowl 230. The pressurized fluid then flows out of the solenoid bowl 230 via the radially positioned exit opening 234, and into the downstream vent passage 225, thus venting the pressure chamber 215.

With reference to FIGS. 1A-1B and 3A, in a "reverse flow" configuration, the positions of the entrance opening and the exit opening are reversed, the exit opening 132 of the solenoid bowl 130 being positioned at the center of the solenoid bowl 130, aligned with the axially central plunger 142 of the solenoid 140, and the entrance opening 134 being positioned radially outwards from center. In such a configuration, the exit opening 132 (or, in this case, a central bleed port 148 of a solenoid retainer 145 aligned with the exit opening 132) constitutes the secondary valve seat of the vent passage flow path. Further, the radially positioned entrance opening 134 is never blocked (unlike in the "forward flow" configuration), and the pressure chamber 115 is in constant fluid communication with the solenoid bowl 130, the high-pressure fluid flooding the solenoid bowl 130 through the entrance opening 134 from the pressure chamber vent passage 124. In this configuration, when the solenoid 140 is deenergized, the axially central plunger 142 of the solenoid 140 blocks the centrally positioned exit opening 132 of the solenoid bowl 130, preventing the fluid from exiting the solenoid bowl 130, and thereby inhibiting venting of the pressure chamber 115. When the solenoid 140 is energized, the plunger 142 is lifted off the centrally positioned exit opening 132, permitting the pressure chamber 115 fluid to flow out the exit opening 132 of the solenoid bowl 130 into the downstream vent passage 125, thus venting the pressure chamber 115.

It is noted that, with certain solenoids, the plunger may not directly engage the central opening of the solenoid bowl to block the central opening. For instance, in the solenoid valve 100 shown in FIGS. 1A-1B, the solenoid 140 may include a plunger retainer 145 downstream of the plunger. A bottom of the plunger retainer 145 may include one or more radially disposed ports 146 to permit passage of fluid entering the solenoid bowl 130 to a location above the retainer 145 in the solenoid 140. The plunger retainer 145 also includes a central bleed port 148 that is aligned with the central opening 132 of the solenoid bowl permitting fluid communication therebetween. Thus, in such a configuration, the plunger 142 becomes seated or unseated on the central bleed port 148 of the retainer 145 to prevent or permit fluid from flowing through the central opening 132 of the solenoid bowl 130.

A reverse flow solenoid can usually only be used with a reverse flow solenoid bowl, and a forward flow solenoid can usually only be used with a forward flow solenoid bowl. This is because solenoid bowls and solenoids need to be specifically engineered depending on whether a forward flow or reverse flow configuration is intended. Generally, a forward flow configuration and a reverse flow configuration introduce different fluid dynamics into a solenoid bowl, which influences the functioning of the solenoid, as explained below.

A solenoid typically includes a solenoid housing that encloses a winding or coils surrounding a portion of a plunger sleeve containing a plunger. In the deenergized state of the solenoid, a spring biases the plunger outward from the plunger sleeve, causing the plunger to seal the central opening of the solenoid bowl. When electrical current is passed through the winding, thereby energizing the solenoid, the plunger is drawn within the plunger sleeve against the biasing force of the spring to withdraw the plunger from sealing the central opening of the solenoid bowl, permitting venting of the fluid from the pressure chamber.

The different design parameters of reverse flow and forward flow solenoids and solenoid bowls result at least in part from the different pressures exerted on the solenoid plunger in each configuration during operation of the valve. In a forward flow solenoid bowl, the high-pressure fluid from the pressure chamber 215 exerts significant pressure directly on a sealing face of the plunger 242 as the plunger 242 covers the central entrance opening 232 in the deenergized state of the solenoid. The forward flow solenoid 240, thus, must be engineered so that the plunger 242 maintains its seal against the entrance opening 232 of the solenoid bowl 230 so that venting does not occur prematurely during the deenergized state, when the valve is intended to be off.

Forward flow solenoids, for example, may require a spring with a higher spring force to overcome the high pressure created by the pressure chamber to maintain the plunger sealed against the secondary valve seat. This may, in turn, require engineering the solenoid to produce a stronger magnetic force (e.g., via additional winding or copper) to overcome the enhanced spring force to raise the plunger from the secondary valve seat.

Further, a forward flow solenoid bowl itself may be configured with adjustments or features to strengthen the sealing interface between the plunger and the central entrance opening 232 of the solenoid bowl against the force of the high-pressure fluid. For instance, the central entrance opening 232 may include specific sealing features, such as a recess and/or projection about the opening configured to align or engage with a corresponding structure on the plunger. The diameter of the central entrance opening 232 may also be sized appropriately (e.g., have a reduced size) to further limit the amount of pressure exerted on the plunger. In some configurations, a reduced size central entrance opening may be formed or reinforced by an insert (such as a conical stainless-steel insert) to maintain the reduced diameter and prevent any change in size due to wear and tear.

For reverse flow solenoids and reverse flow solenoid bowls, the seal of the plunger against the central opening, which is an exit opening 132, is not as vulnerable as in the forward flow configuration, since there is no high-pressure fluid from the pressure chamber exerting force on the sealing face of the plunger against the spring force. Instead, in the sealed position, the high-pressure fluid is already in the solenoid bowl 130, having entered through the radially disposed entrance opening 134. Reverse flow solenoids, then, may not need particularly strong springs to bias the plunger into the sealed position.

In addition to the above-described differences that arise from the different vent passage flow paths, forward flow solenoids and solenoid bowls may have other incompatibilities with reverse flow solenoids and solenoid bowls. For instance, a reverse flow solenoid may not be the correct size to fit a forward flow solenoid bowl or may not be able to be mounted on the bowl due to different threading. Such differences in diameter or threading may, for example, vary across manufacturers.

The incompatibilities between different solenoids and different solenoid bowls described above result in an inflexible market that is inconvenient and impractical to both manufacturers and end-users. It would instead be desirable for a given solenoid bowl on a given valve to be compatible with different kinds of solenoids. In this manner, an end-user can choose a solenoid for a valve based on availability, cost, or manufacturer, and is not constrained by the type of solenoid bowl present on a valve. Manufacturers can also expand their markets by being able to sell types of solenoids into systems that were originally configured for use with a different type of solenoid.

Accordingly, a solenoid adapter is provided herein that permits use of different solenoids with normally incompatible solenoid bowls. Or, in other words, a solenoid that is incompatible for direct use with a valve solenoid bowl is permitted to be used with the solenoid bowl via the solenoid adapter. Specifically, a reverse flow solenoid adapter can enable use of a reverse flow solenoid with a forward flow solenoid bowl, while a forward flow solenoid adapter can enable use of a forward flow solenoid with a reverse flow solenoid bowl. Generally, such an adapter is designed with a lower section configured to mount into the desired type of valve solenoid bowl and an upper portion including an adapter solenoid bowl or chamber having a cavity dimensioned to receive a desired type of solenoid. The adapter further includes "flow-reversing" passages that duct the vent passage flow path from the valve solenoid bowl to the solenoid in such a manner that the flow path transitions from the flow configuration of the valve solenoid bowl to the flow configuration required for the desired solenoid to function, and then transitions back to the flow configuration of the valve solenoid bowl as the path returns to the valve solenoid bowl.

Figure 4:
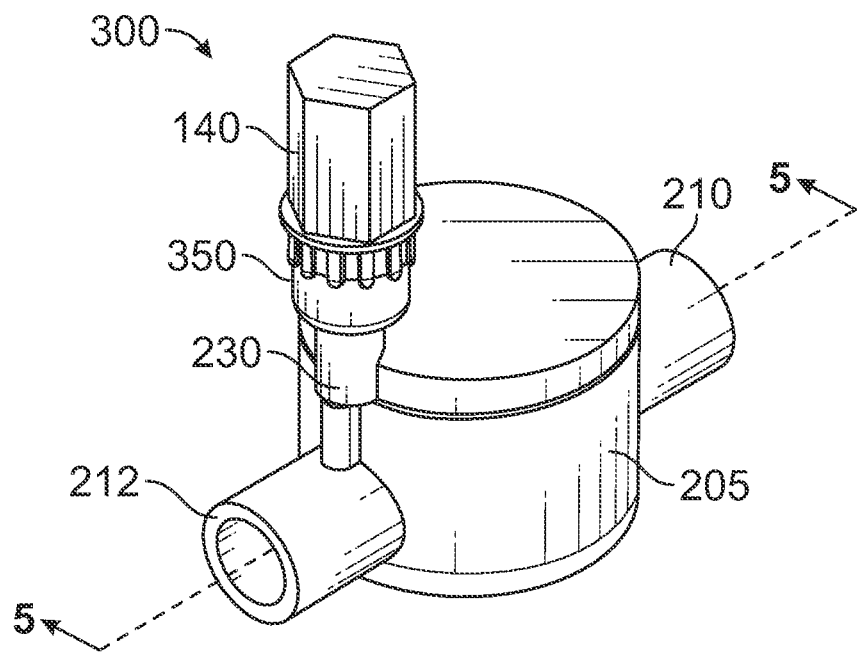
FIG. 4 is a perspective view of a solenoid valve having a forward flow solenoid/solenoid-bowl configuration accommodating a reverse flow solenoid via a reverse flow solenoid adapter.
Figure 5:
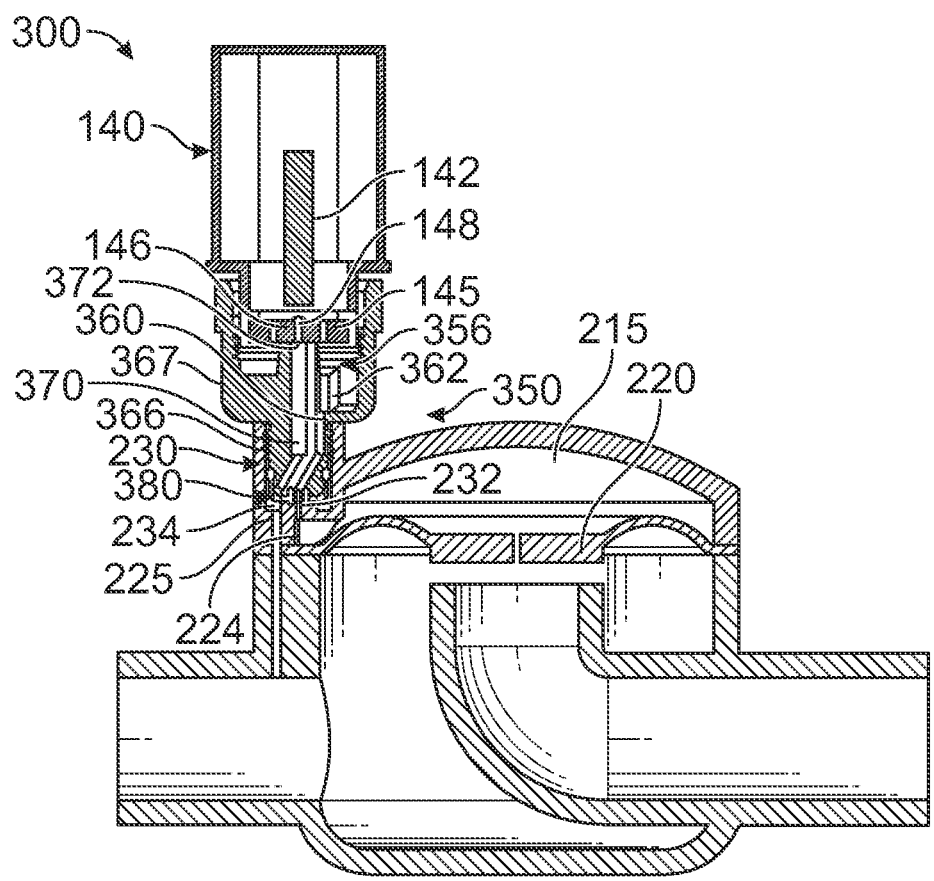
FIG. 5 is a cross-section view of the solenoid valve of FIG. 4 taken along line 5-5 of FIG. 4.

FIGS. 4-5 illustrate a solenoid valve 300 that includes a forward flow solenoid bowl 230, a reverse flow solenoid 140, and a reverse flow solenoid adapter 350 which enables the reverse flow solenoid 140 to be used with the forward flow solenoid bowl 230. The reverse flow adapter 350 includes a lower portion 366 that is threaded into the solenoid bowl 230 and an upper portion 367 with an open end that forms a cavity or adapter solenoid chamber (or bowl) 356 for receiving the reverse flow solenoid 140. The lower threaded portion 366 has dimensions and threading that permit the lower portion to be properly mounted in the forward flow solenoid bowl 230, while the cavity 356 of the upper portion 367 has dimensions and threading to accommodate the reverse flow solenoid 140. The adapter 350 additionally includes two flow-reversing passages, a flow-reversing inflow (or inlet) passage 360 and a flow-reversing outflow (or outlet) passage 370. Both passages extend from the lower portion 366 of the adapter 350 up through the adapter to the adapter solenoid chamber 356 and are effective to allow passage of fluid between the forward flow solenoid bowl 230 and the adapter solenoid chamber 356. In doing so, the flow-reversing passages 360, 370 transition the vent passage flow path between the forward flow solenoid bowl 230 and the reverse flow solenoid 140 in such a manner that the reverse flow solenoid 140 can properly function to actuate the valve 300.

Specifically, the flow-reversing inflow passage 360 ducts fluid flowing through the entrance opening 232 of the forward flow solenoid bowl 230 from the forward flow configuration to a reverse flow configuration as the fluid travels downstream to the adapter solenoid chamber 356. To do so, the flow-reversing inflow passage 360 includes at least one angled portion or segment effective to shift or transition fluid that entered the forward flow solenoid bowl 230 through the axially central entrance opening 232 towards an opening 362 in the adapter solenoid chamber 356 that is radial of center. Thus, the fluid floods into the adapter solenoid chamber 356 through a radially disposed opening 362, in a manner typical of a reverse flow solenoid bowl, without being inhibited by the solenoid's axially central plunger 142. Like a typical reverse flow solenoid bowl, the fluid is then able to vent from the adapter solenoid chamber 356 when the solenoid is energized to lift the plunger 142 off the secondary valve seat (in this case the central bleed port 148 of the solenoid retainer 145), permitting the fluid to flow out a centrally disposed orifice of a flow-reversing outflow passage 370.

The flow-reversing outflow passage 370 then ducts the fluid flowing out of the adapter solenoid chamber 356 back down to the forward flow solenoid bowl 230 to complete the venting. In this case, the flow-reversing outflow passage 370 must duct the fluid from the reverse flow configuration back to the forward flow configuration. To do so, the flow-reversing outflow passage 370, like the inflow passage 360, includes at least one angled portion or segment effective to shift or transition fluid that passed out the axially central outflow passage orifice 372 towards a portion of the forward flow solenoid bowl 230 radially outboard of center which is hydraulically connected to the radially disposed exit opening 234 of the forward flow solenoid bowl 230. Upon return to the forward flow solenoid bowl 230, the fluid then passes out the exit opening 234 into the downstream vent passage 225 on the outlet side of the valve 300, thus venting the pressure chamber 215 and opening the valve 300.

As illustrated in FIG. 5, the solenoid adapter 350 further includes a cap seal 380 affixed to the lower portion of the adapter to form a sealing interface between a nose of the adapter 350 and the solenoid bowl 230. The sealing interface includes openings which permit fluid communication between the openings 224, 234 of the solenoid bowl 230 and the flow-reversing passages 360, 370, and provides sufficient sealing between the solenoid bowl 230 and adapter 350 to minimize pressure loss as the fluid flows therebetween. Features of the cap seal will be described in further detail with respect to FIGS. 13-17.

Figure 6:
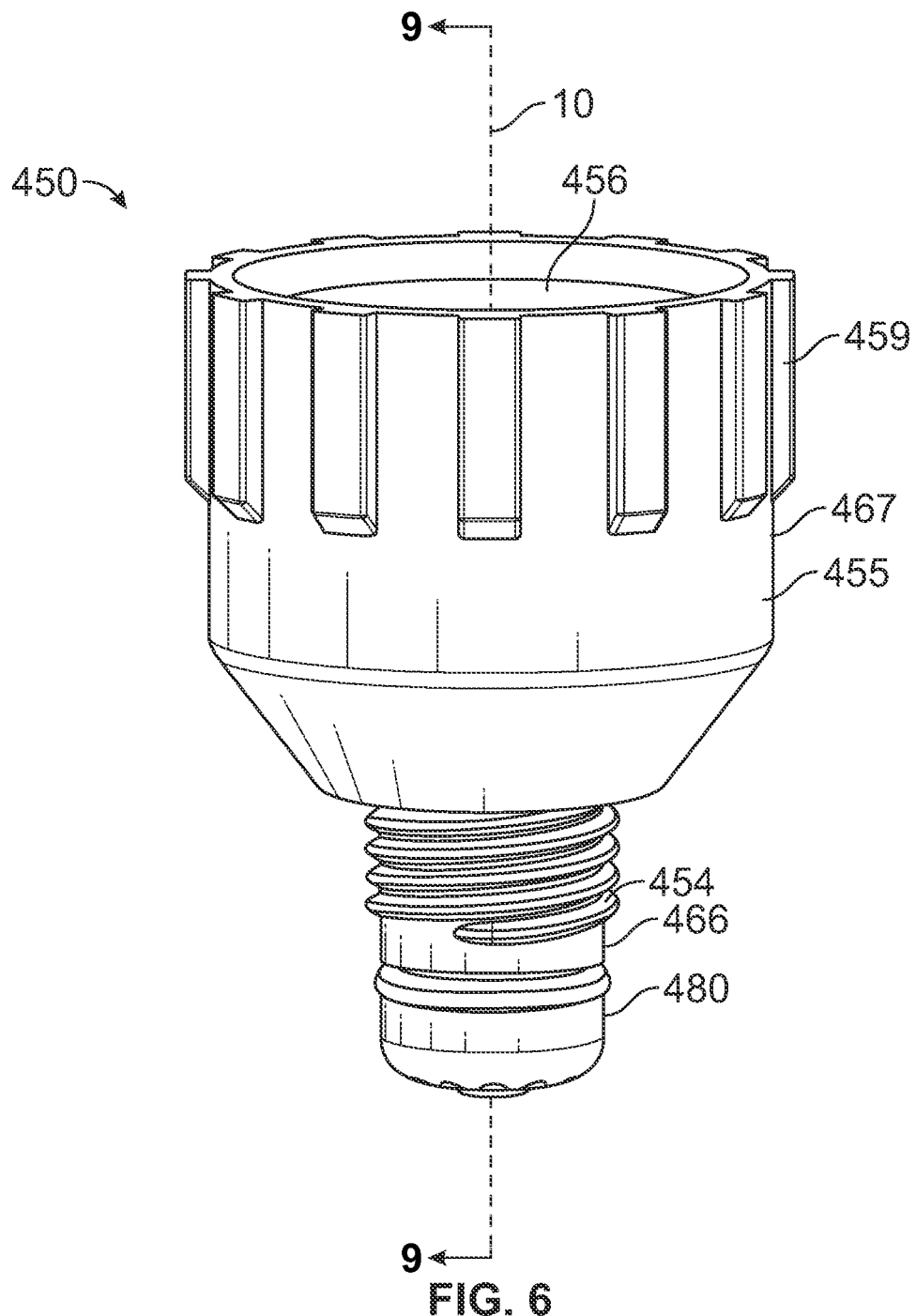
FIG. 6 is a side perspective view of a reverse flow solenoid adapter.
Figure 7:
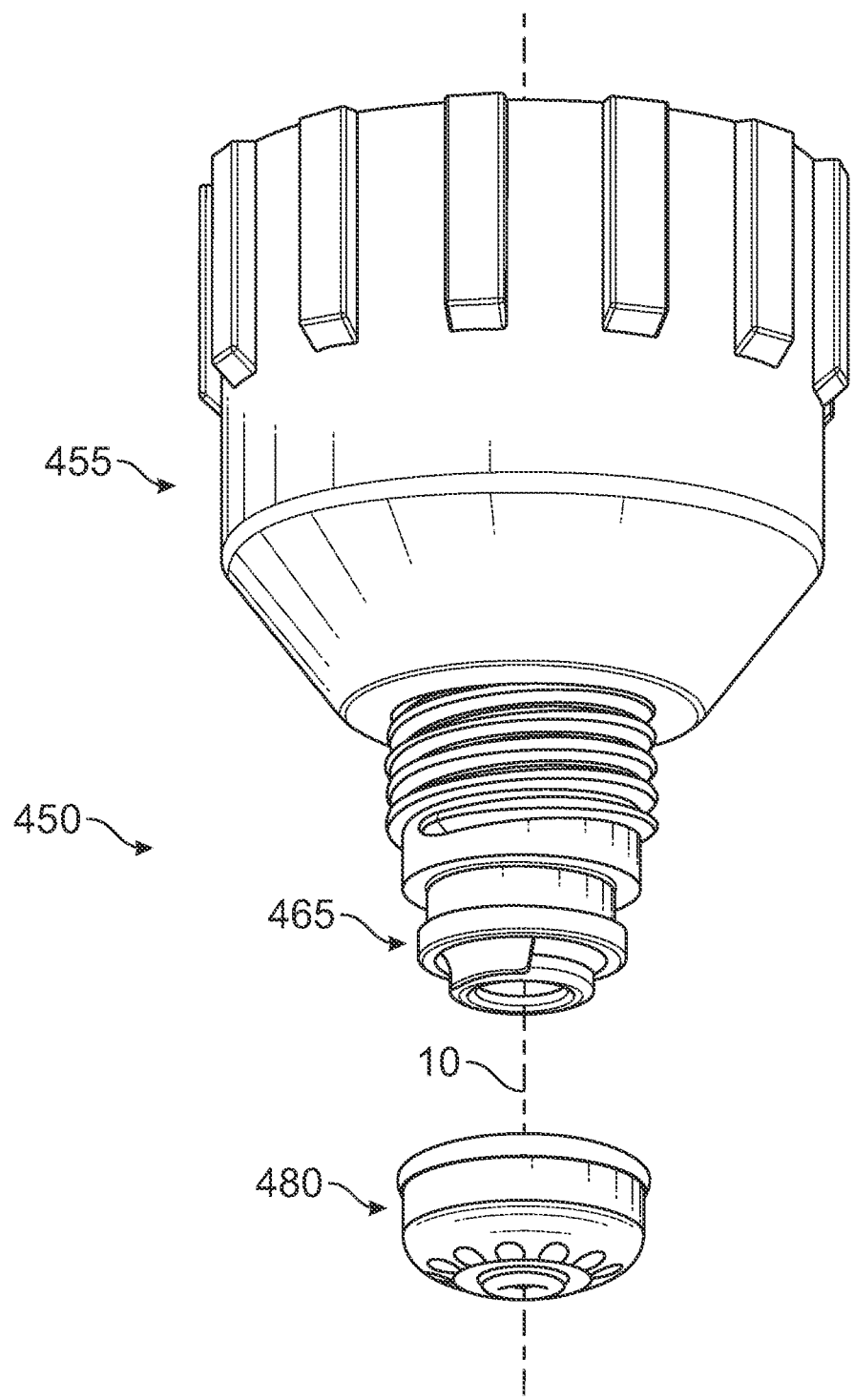
FIG. 7 is an exploded view of the reverse flow solenoid adapter of FIG. 6.
Figure 8:
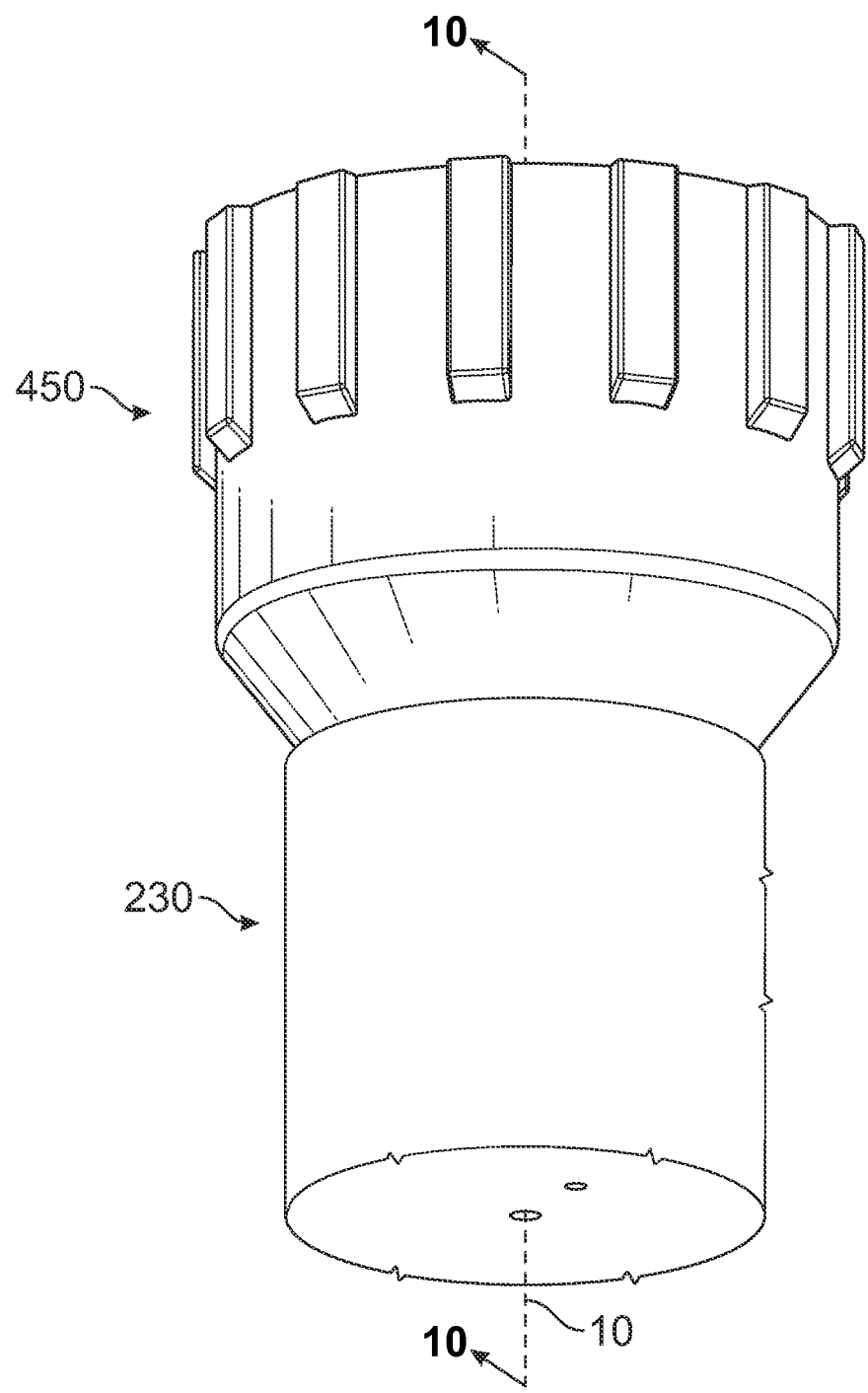
FIG. 8 is a side perspective view of the reverse flow solenoid adapter of FIG. 6 inserted into a forward flow solenoid bowl (with the rest of the valve not shown)

FIGS. 6-7 illustrate an embodiment of a reverse flow solenoid adapter 450, which includes the general features of the reverse flow solenoid adapter 350 described above. As illustrated, the reverse flow solenoid adapter 450 includes a main body 455 and a cap seal 480 that is affixed to a nose 465 at the end of a lower portion 466 of the main body 455. The lower, generally cylindrical, portion 466 of the body 455 includes external threads 454 that can be mated with internal threads of a solenoid bowl. In this case, the dimensions and threading 454 of the lower portion 466 of the reverse flow solenoid adapter 450 are designed to correspond to the dimensions and threading of a particular forward flow solenoid bowl to enable proper mounting of the adapter 450 in the forward flow solenoid bowl. FIG. 8 illustrates the reverse flow solenoid adapter 450 inserted into such a forward flow solenoid bowl 230 (for simplicity, the rest of the valve is not shown).

With reference to FIGS. 6 and 9-12, an upper portion 467 of the main body 455 is generally dimensioned to receive a reverse flow solenoid into a cavity of an adapter solenoid chamber or bowl 456. Thus, there is internal threading 476 on the walls of adapter solenoid chamber 456 to mate with external threading on a reverse flow solenoid when the reverse flow solenoid is inserted into the chamber 456. The upper portion 467 of the main body 455 has a generally cylindrical shape and may have a frustoconical portion 469 adjacent to the lower portion 466. The main body 455 also may include one or more outer ribs 459 or grooves to facilitate gripping and turning of the adapter 450 as a user manually screws the adapter 450 into a solenoid bowl.

Figure 9:
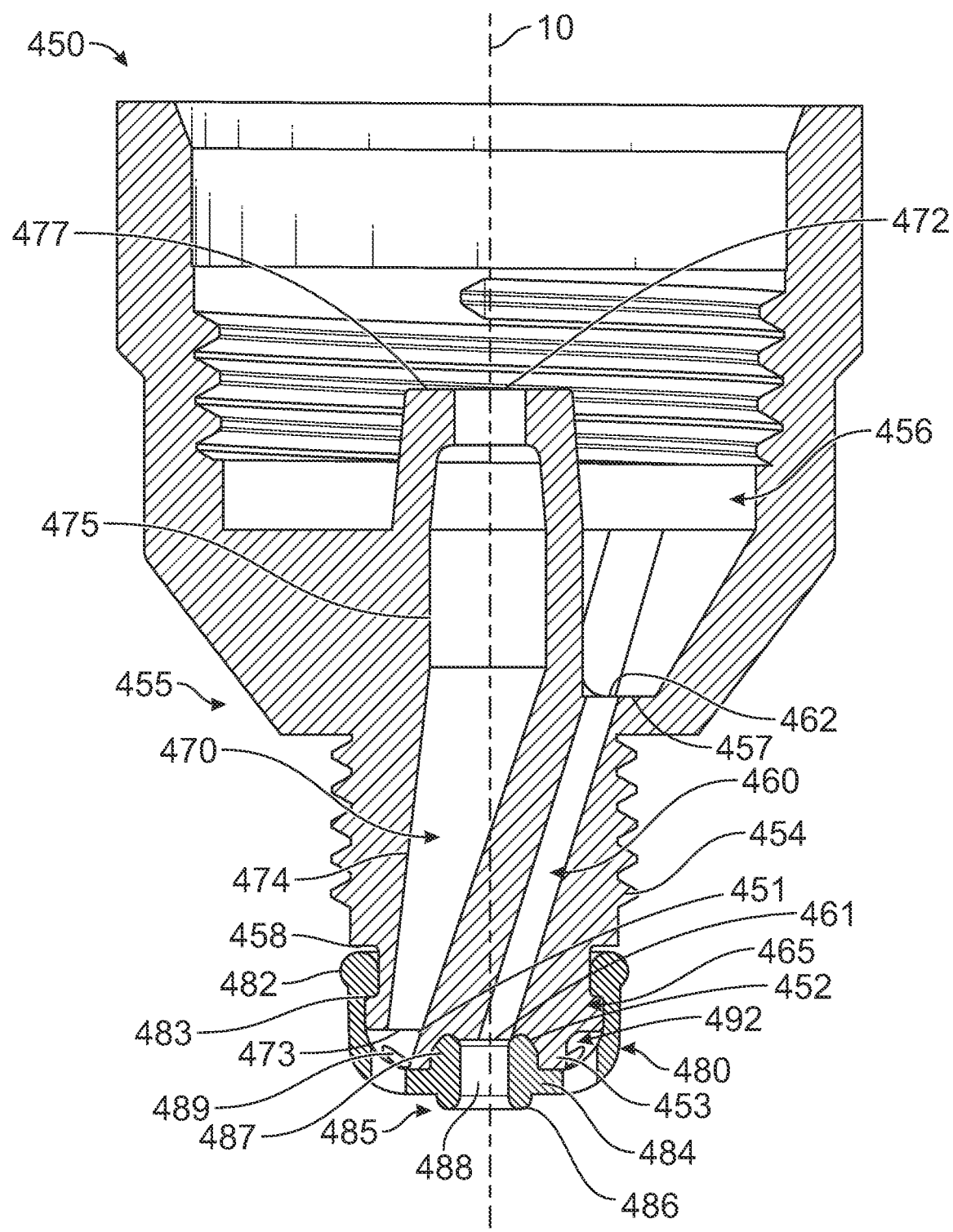
FIG. 9 is a cross-section view of the reverse flow solenoid adapter of FIG. 6 taken along line 9-9 of FIG. 6.
Figure 10:
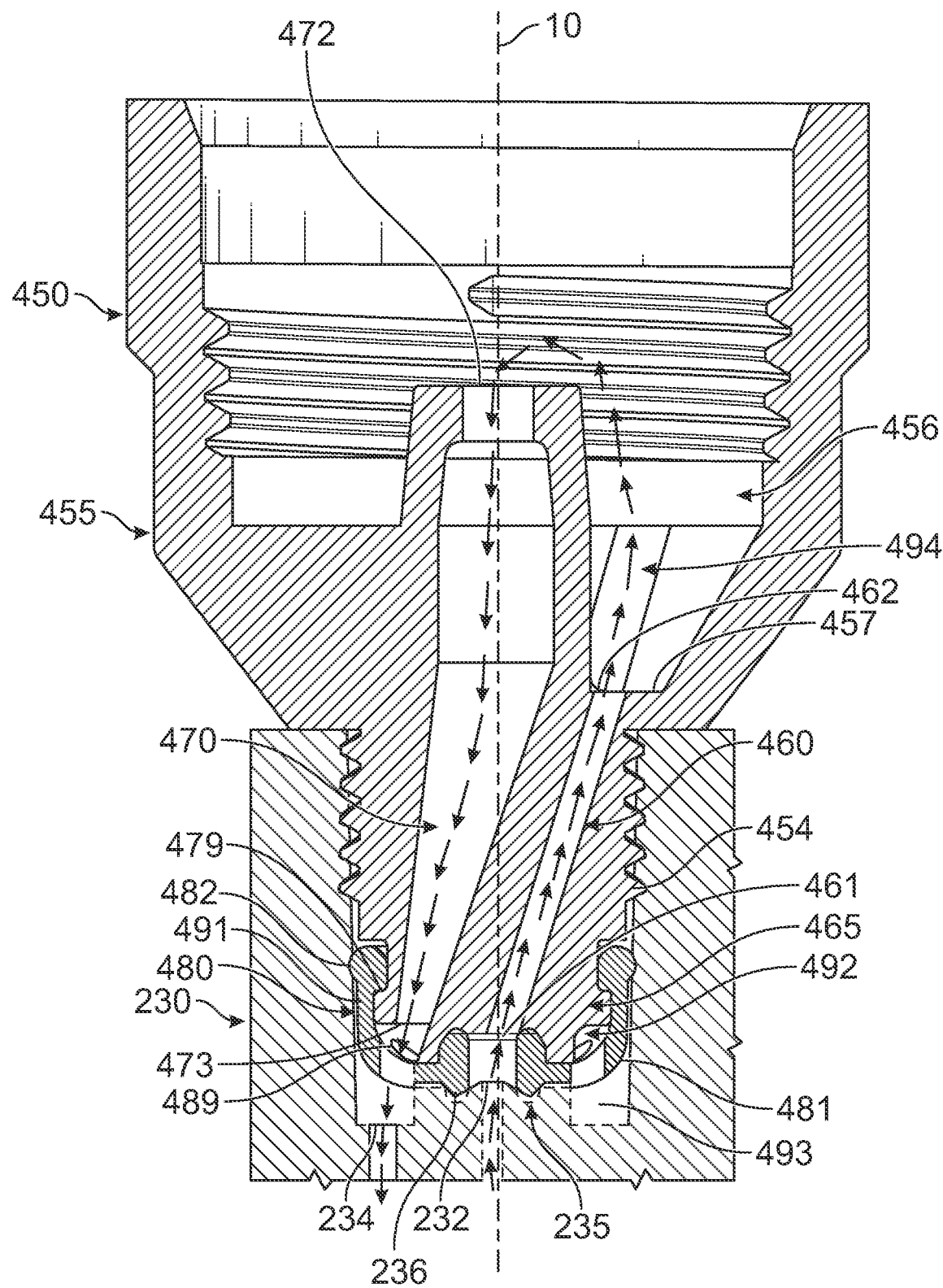
FIG. 10 is a cross-section view of the reverse flow solenoid adapter of FIG. 6 inserted into a forward flow solenoid bowl taken along line 10-10 of FIG. 8.
Figure 11:
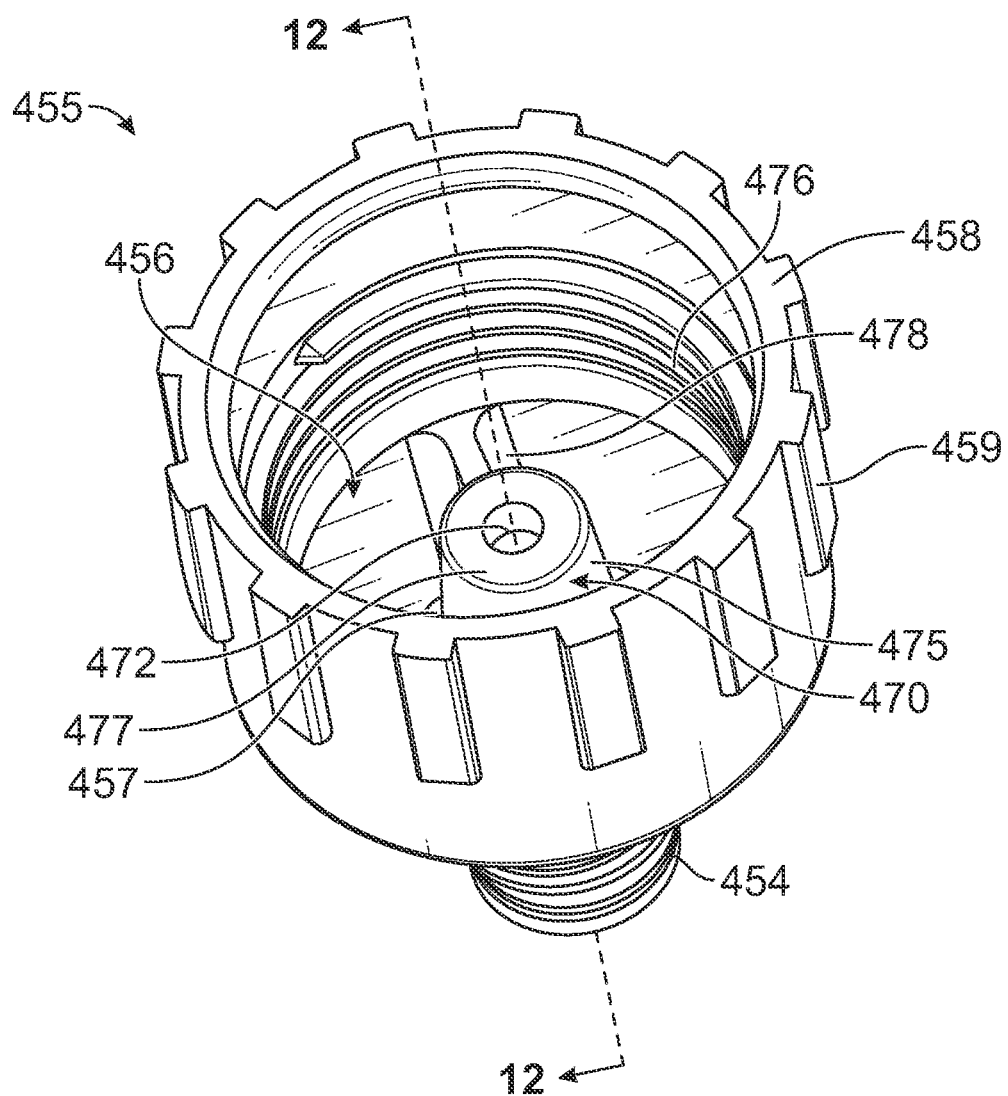
FIG. 11 is a top perspective view of a main body of the reverse flow solenoid adapter of FIG. 6.

FIG. 9 illustrates the interior ducting of the reverse solenoid adapter 450, while FIG. 10 illustrates the vent passage flow path 494 taken by the high-pressure fluid through the solenoid bowl 230 and through the ducting of the reverse solenoid adapter 450 during operation of the valve. Generally, the high-pressure fluid travels a circuitous path from the forward flow solenoid bowl 230 up through the adapter 450 to the adapter solenoid chamber 456 and, when the solenoid is energized to retract the plunger, back down to the forward flow solenoid bowl 230 again.

With reference to FIGS. 9 and 10, a reverse flow solenoid adapter 450 includes two flow-reversing passages 460, 470 in the interior of the adapter 450 that extend lengthwise from the nose 465 of the adapter 450 to the adapter solenoid chamber or cavity 456. These passages include a flow-reversing inflow (or inlet) passage 460 and a flow-reversing outflow (or outlet) passage 470. The flow-reversing inflow passage 460 extends from a centrally disposed first inflow passage orifice 461 that, in use, is aligned with a centrally disposed entrance opening 232 of a forward flow solenoid bowl 230. The flow-reversing inflow passage 460 extends lengthwise through the interior of the adapter body 455 towards a floor 457 or bottom of the adapter solenoid chamber 456. The flow-reversing inflow passage 460 is angled as it extends towards the floor 457. As a result of this angling, a second inflow passage orifice 462 at the interface between the inflow passage 460 and the adapter solenoid chamber 456 is disposed on the floor 457 of the adapter solenoid chamber 456 in a position radial of center. Thus, fluid traveling from the centrally disposed entrance opening 232 of the forward flow solenoid bowl 230 through the flow-reversing inflow passage 460 is transitioned into a reverse flow configuration, entering the adapter solenoid chamber 456 via the radially disposed orifice 462. In the manner typical of a reverse flow solenoid bowl, the fluid is free to fill the adapter solenoid chamber 456 and only vents from the chamber 456 when a plunger of a solenoid is retracted to permit flow through flow-reversing outflow passage 470.

The flow-reversing outflow passage 470 returns fluid from the adapter solenoid chamber 456 back to the forward flow solenoid bowl 230. The flow-reversing outflow passage 470 thus extends lengthwise through the adapter 450 from the adapter solenoid chamber 456 to the forward flow solenoid bowl 230. The outflow passage 470 includes an upper portion or segment 475 which runs substantially vertically along a central longitudinal axis 10 of the adapter 450. At least a substantial portion of the centrally disposed upper portion 475 protrudes or projects into the adapter solenoid chamber 456 in the direction of an inserted solenoid and may be supported in the chamber 456 by one or more ribs or spokes 478 which connect the sides of the protruding upper portion 475 to the interior wall of the chamber 456. The centrally disposed upper portion 475 terminates in a first outflow passage orifice 472 that is centrally disposed in the adapter solenoid chamber 456. During operation of the valve, the axially central plunger of the solenoid, axially aligned with the centrally disposed orifice 472, selectively permits or blocks flow of fluid through the centrally disposed orifice 472, permitting or preventing fluid from passing into the outflow passage 470. For instance, when the solenoid is in a deenergized state, a leading face of a plunger may sealingly engage an exposed top annular surface or sealing surface 477 of the centrally disposed upper portion 475 about the centrally disposed orifice 472 (illustrated most distinctly in FIG. 11), the top annular surface 477 about the centrally disposed orifice 461 functioning as a valve seat. In this manner, the plunger may block the flow of fluid out of the adapter solenoid chamber 456, inhibiting venting.

Alternatively, in other configurations (as discussed with respect to FIGS. 1A-1B), a plunger may not directly engage the annular surface 477 if the solenoid includes a plunger retainer 145. In such configurations, upon threading the solenoid into the adapter solenoid chamber 456, a bottom of the retainer is sealingly pressed against the annular surface 477, and a central bleed port 148 of the plunger retainer 145 is in substantial alignment with the centrally disposed orifice 472 forming a hydraulically continuous passage therebetween. This type of configuration is illustrated in FIG. 5. In this manner, when the solenoid is deenergized the plunger seals the central bleed port 148 of the retainer 145, which prevents fluid from flowing out the centrally disposed orifice 472, inhibiting venting.

The flow-reversing outflow passage 470 also includes a lower angled portion or segment 474 which may run generally parallel to the angled inflow passage 460. As such, after fluid exits through the centrally disposed orifice 472 and down the centrally disposed upper portion 475 of the outflow passage 470, the lower angled portion 474 is effective to transition or shift the fluid flow path from the reverse flow configuration of the adapter solenoid chamber 456 back to the forward flow configuration of the forward flow solenoid bowl 230. That is, fluid exiting the central orifice 472 of the adapter solenoid chamber 456 is ducted to exit the radially disposed exit opening 234 of the forward flow solenoid bowl 230, so that the fluid can subsequently be dumped into the low-pressure downstream vent passage on the outlet side of the valve.

The dimensions of the flow-reversing passages 460, 470, as well as the dimensions of the orifices 461, 462, 472, and 473, may be adjusted in order to achieve an optimal fluid flow having a correct pressure and velocity as the fluid passes through the adapter. For instance, the bends in the flow path through the adapter create some resistance to the pressurized fluid as the fluid flows, which can result in pressure loss. A significant increase in pressure loss through the adapter can result in the valve not opening, opening slowly or tentatively, or not opening as far as it should for a given flow. Such pressure loss can be mitigated by slowing the fluid so that the fluid smoothly navigates the bends, which can generally be accomplished by gradually increasing the cross-sections of the passages and openings of the adapter. For instance, though the central entrance opening 232 of the forward flow solenoid bowl 230 may establish a specific choke point of the flow system through the adapter assembly, all the other passages in the adapter may have a larger diameter or cross-section. For example, the passages and orifices of the adapter 450 may each have a diameter or cross-section at least twice as large as the central entrance opening 232 of the forward flow solenoid bowl 230. For instance, in one non-limiting embodiment, if the central entrance opening 232 of the forward flow solenoid bowl 230 has a diameter of about 0.030 inches, the passages 460, 470 and orifices 461, 462, 472, and 473 of the adapter 450 can each have a diameter of at least about 0.060 inches to provide less resistance to the flow of fluid to mitigate pressure loss and prevent additional choke points. Ports in a plunger retainer 145 of a solenoid 140, such as the central bleed port 148 and radially disposed ports 146, may also have these increased diameters or cross-sections.

Figure 12:
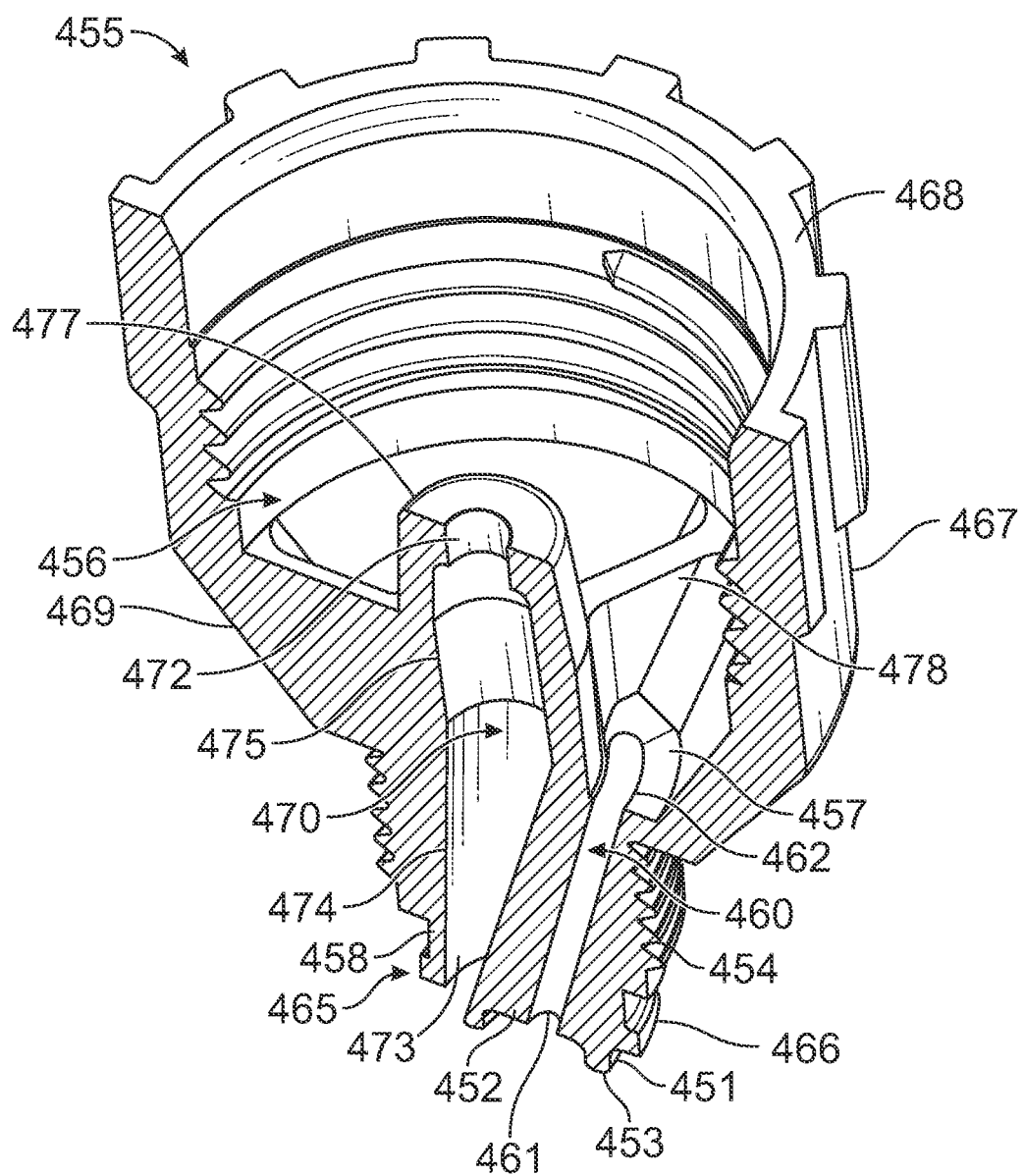
FIG. 12 is a perspective cross-section view of a main body of the reverse flow solenoid adapter of FIG. 6 taken along line 12-12 of FIG. 11.
Figure 13:
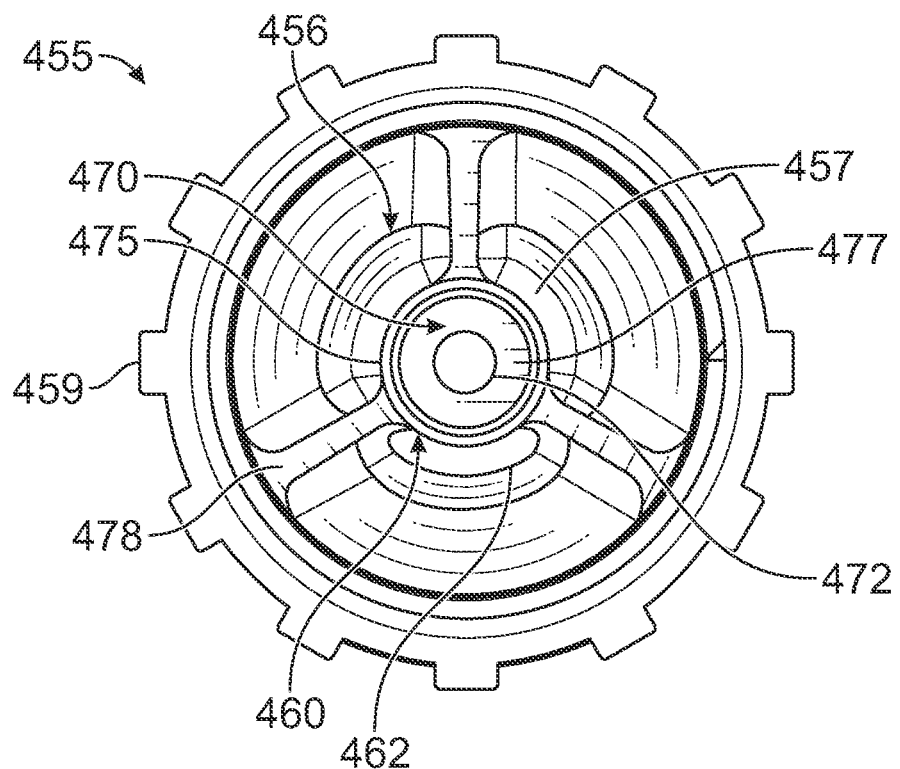
FIG. 13 is a top plan view of a main body of the reverse flow solenoid adapter of FIG. 6.

Preferably, the main body 455 and the flow-reversing passages 460, 470 of the reverse flow solenoid adapter 450 (or a forward flow solenoid adapter 650, discussed further below) are formed integrally with one another and/or as a single piece. Preferred methods of manufacturing a solenoid adapter described herein include 3D printing or injection molding. 3D printing is particularly suitable for yielding an adapter having the flow-reversing passages 460, 470 illustrated in FIGS. 9-10 and FIG. 12, which have a precisely optimized shape and configuration. Such passages are configured to ensure the largest flow area practical to minimize pressure losses through the adapter system while at the same time having a geometry that is compatible with other design parameters of the adapter. For instance, to enable a smooth flow path through the passage 470, the passage 470 is configured, as noted above, with a cross-section that is larger than the central entrance opening 232 of the forward flow solenoid bowl 230. For example, as shown in FIGS. 10 and 12, the outflow passage 470 may include a centrally disposed vertical portion or segment 475 extending vertically along the central axis 10 of the adapter 450 that generally has a larger cross-section than the cross-section of central entrance opening 232 of the forward flow solenoid bowl 230. However, because the inflow passage 460 extends from a central position at the lower portion 466 of the adapter 450, as the outflow passage 470 extends down into the lower portion 466 the outflow passage 470 must extend radially to avoid the inflow passage 460 and to maintain sufficient connecting web therebetween.

To this end, the outflow passage 470 includes an angled portion or segment 474 that extends from the vertical portion 475 to the radially disposed second outflow orifice 473 at the nose 465 of the adapter 450. While the angled portion 474 includes a substantially circular cross-section at the end opposite the second outflow orifice 473 (at the interface between the vertical portion 475 and the angled portion 474), the angled portion 474 has a gradually transitioning geometry as it extends to the second outflow orifice 473. For instance, as illustrated most clearly in FIG. 12, a circular cross-section of the angled portion 475 transitions into a curved ovaloid shape as it extends at an angle towards the radially disposed second outflow orifice 473. The outflow passage 470 being a curved ovaloid shape instead of a circular shape as the passage 470 extends into the lower portion 466 of the adapter 450 permits the passage 470 and orifice 473 to fit in the narrowly configured lower portion 466 while maintaining a minimum or sufficient total cross-sectional area of the passage 470 for mitigating pressure loss.

The inflow passage 460, illustrated most clearly in FIG. 12, also includes a gradually transitioning cross-section across its length, the passage 460 extending from a generally circular first orifice 461 to a curved ovaloid second outflow orifice 462. that is larger than the first orifice 461. Like the configuration of the outflow passage 470, the configuration of the inflow passage 460 is also advantageous for maintaining smooth fluid flow through the adapter 450 and reducing pressure loss. For instance, the size of the circular first inflow orifice 461 may be limited due to its central position at the lower end 466 of the adapter 450 and the narrow configuration of the nose 465. However, gradually increasing the cross-section of the passage 460 as the passage 460 extends from the circular first inflow orifice 461 to the second inflow orifice 462 permits smooth fluid flow and reduces pressure loss. Moreover, as illustrated, the passage 460 may transition from a generally circular cross-section to a curved ovaloid cross-section as the passage 460 extends at an angle from a central position at the lower portion 466 of the adapter 450 up through the upper portion 467 of the adapter 450 to a radial position on the floor 457 of the adapter solenoid chamber 456. The transition to a curved ovaloid cross-section permits the cross-section of the passage 460 to be increased while maintaining compatibility with other aspects of the configuration of the adapter 450. For instance, a curved ovaloid shape, compared to a circular shape having an equivalent cross-sectional area, allows there to be sufficient clearance and connecting web between the inflow passage 460 and the outflow passage 470. The curved ovaloid shape also allows the second inflow orifice 462 to fit on the narrowly configured floor 457 of the adapter solenoid chamber 456.

When 3D printing the adapter, the design of the passages may be provided by lofting a profile modeling a desired orifice at one end of the passage to a profile modeling a desired orifice at the other end of the passage and sculpting the interior of the passage from the resulting surface. For instance, the inflow passage 460 connecting the first inflow passage orifice 461 at the adapter's nose 465 to the floor 457 of the adapter solenoid chamber 456 may be modeled using a circle profile at the ceiling of the first orifice 461 and lofting the circle profile to a curved ovaloid profile on the floor 457 of the adapter solenoid chamber 456. The surface that results from lofting between these two profiles may then be used to sculpt out the inflow passage 460 of the adapter.

Similarly, the lower angled portion 474 of the outflow passage 470 connecting the upper portion 475 of the outflow passage 470 to the second outflow passage orifice 473 may be lofted using the profile formed by the lower edge of the upper portion 475 and lofting to a curved ovaloid profile at the bottom of the adapter. The volume inside the resulting surface may then be sculpted out from the solid material of the adapter body 455, creating the angled portion 474 of the outflow passage 470.

The passages 460, 470 and the orifices 461, 462, 472, 473 of the solenoid adapter 450 could also have other configurations, dimensions, and shapes to maintain a correct or optimal pressure in the system for operation of the valve, provided that they have a larger profile than the choke point of the system (i.e., in this case, the central entrance opening 232 of the forward flow solenoid bowl). Thus, the illustrated configuration is not intended to be limiting.

FIGS. 11-14 illustrate a main body 455 of the reverse flow solenoid adapter 450 with the cap seal 480 removed. As noted above, the main body 455 may have a generally cylindrical, lower portion 466 to be inserted into a solenoid bowl, the lower portion 466 including the nose 465 of the adapter 450. An upper portion 467 of the body 455 is generally cylindrical with a larger diameter than the lower portion 466, and may, as illustrated, have a frustoconical portion 469 intermediate the upper portion 467 and the lower portion. The upper 467 portion of the body 455 is generally bowl-shaped, substantially open at its top side and having an upper rim 468, and with a substantially hollowed out interior forming a cavity or adapter solenoid chamber or bowl 456 for receiving a solenoid and for receiving fluid from a valve. To the extent the main body 455 includes the frustoconical portion 469, the adapter solenoid chamber 456 is similarly frustoconical, with a floor 457 have a smaller diameter than the open top side of the adapter, and with angled side walls adjacent the floor 457.

Figure 14:
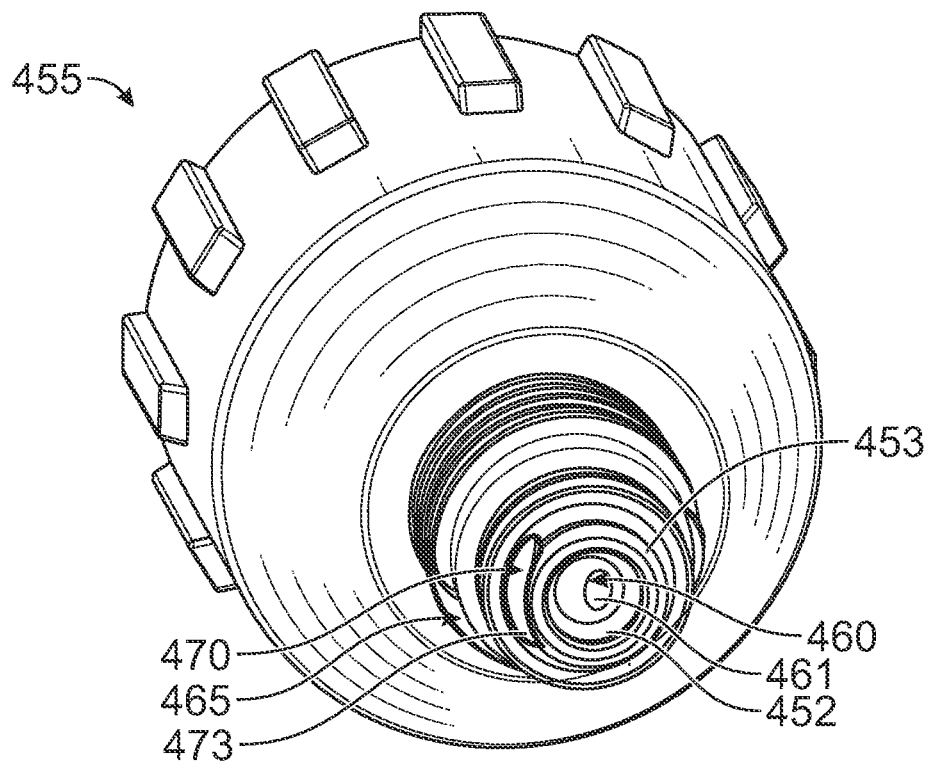
FIG. 14 is a bottom perspective view of a main body of the reverse flow solenoid adapter of FIG. 6.

The lower portion 466 of the main body 455, as noted previously, contains threading for screwing the adapter 450 into a forward flow solenoid bowl 230. The lower portion 466 has a nose 465 that is specifically structured to fluidly communicate the ducting of the adapter 450 (i.e., the flow-reversing passages 460, 470) with the ducting of a forward flow solenoid bowl. Thus, the bottom of the nose 465 includes the above-described centrally disposed first inflow passage orifice 461 to align with a central entrance opening 232 of a forward flow solenoid bowl 230 and the above-described radially disposed second outflow passage orifice 234 fluidly communicates with a radially disposed exit opening of a forward flow solenoid bowl. As illustrated in FIG. 14, and noted previously, the inflow passage orifice 461 may have a generally circular shape, while the outflow passage orifice 473 may have a curved ovaloid shape.

The lower portion of the adapter body 455 and the nose 465 also must be structured or configured in view of the structure or configuration of a forward flow solenoid bowl so that a precise fit is achieved that correctly protects the flow passages at the interface between the adapter and the solenoid bowl. The nose 465 also may be configured to accommodate one or more sealing members, such as the cap seal 480 of the illustrated embodiment.

As illustrated in FIG. 10, the cap seal 480 is affixed to the nose 465 of the adapter body 455 and is effective to provide suitable sealing at the adapter 450/solenoid bowl 230 interface to maintain the vent passage flow path and minimize pressure loss for proper valve functioning. For instance, with reference to FIGS. 9 and 10, the lower portion of the adapter body 455 includes an annular o-ring groove 458 for receiving an o-ring seal portion 482 of the cap seal 480. The bottom of the nose 465 may also include a central annular projection 453 which forms both a central recess 452 of the nose 465 and an annular groove 451 around the bottom of the nose 465. The central recess 452 is configured to receive an inner seal portion, such as donut seal portion 485, of the cap seal 480, the central opening 488 of the donut seal aligned with the first inflow passage orifice 461 to passage fluid between the entrance opening 232 of the solenoid bowl 230 and the first inflow passage orifice 461. The central annular projection 453 and the recess 452 pilot the donut seal portion 485, providing radial support. This prevents the donut 485 from getting blown out due to stress and maintains the donut 485 in place so as not to shift to cover the first inflow passage orifice 461. Further, the central annular projection 453 is sealingly engaged by a corresponding annular face seal portion 484 of the cap seal 480. Sealing from both the donut and the face seal portions 485, 484 isolates and protects the flow of fluid into the adapter 450 against pressure loss (e.g., losses for leakage).

Figure 15:
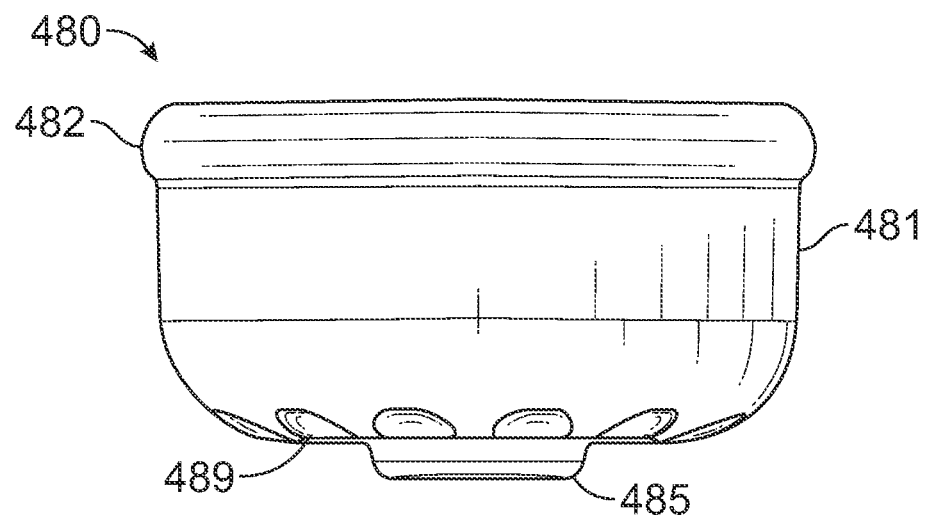
FIG. 15 is an elevational view of a cap seal of the reverse flow solenoid adapter of FIG. 6.
Figure 16:
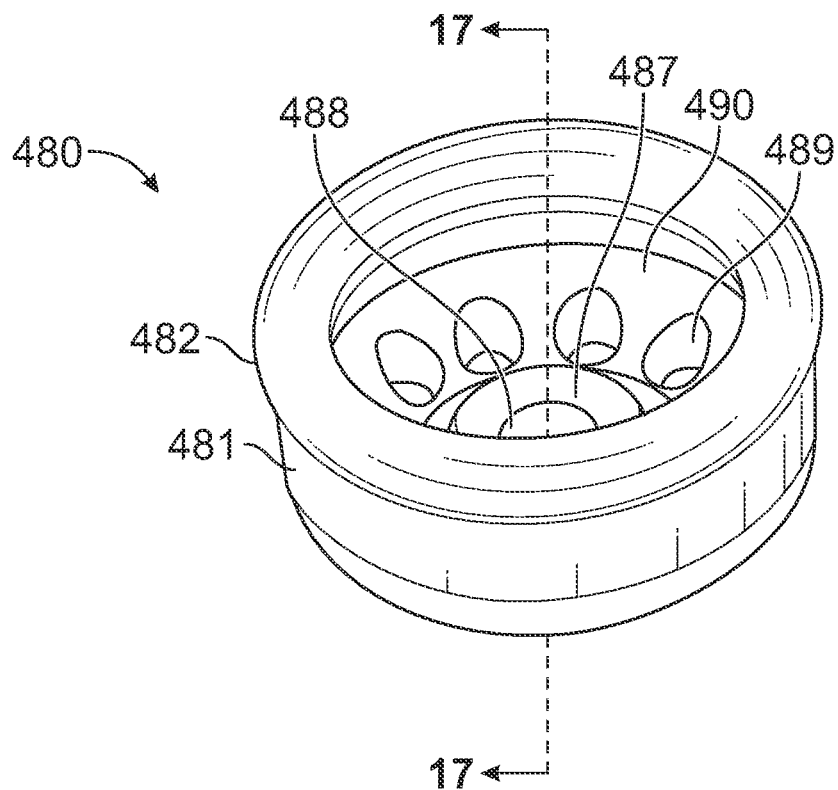
FIG. 16 is a perspective view of a cap seal of the reverse flow solenoid adapter of FIG. 6.
Figure 17:
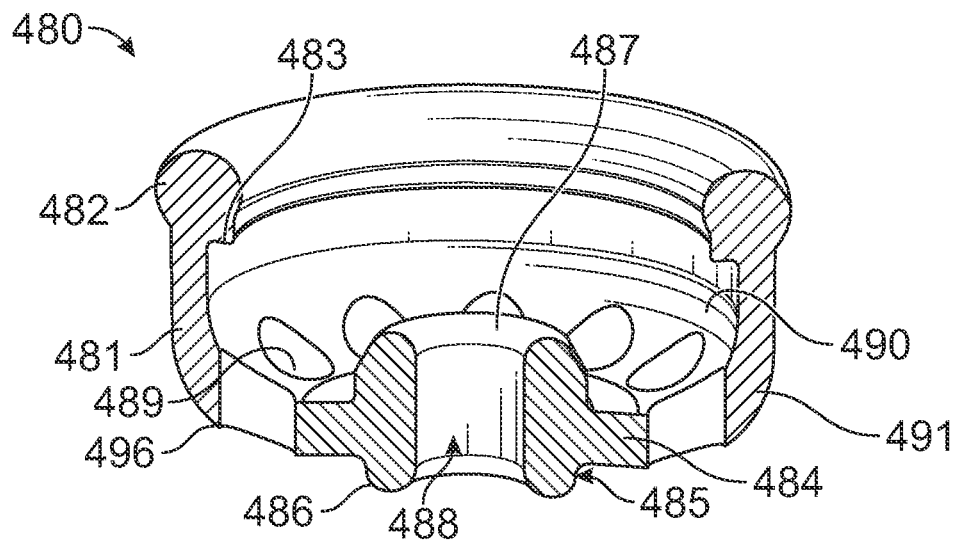
FIG. 17 is a perspective cross-section view of a cap seal of the reverse flow solenoid adapter of FIG. 6 taken along line 17-17 of FIG. 16.

As illustrated in FIGS. 15-17, the cap seal 480 has a generally bowl-shaped body 481 and is sized to be affixed along the bottom and sides of the nose 465 of the adapter to provide a sealing cap that advantageously provides several sealing functions in a single integral piece. The cap seal 480, as noted above, has the upper o-ring seal portion 482 that is inserted into the o-ring groove 458 of the adapter, as illustrated in FIGS. 9-10. As shown in FIG. 17, a lower inner quadrant of the o-ring seal portion 482 may include a projection 483, for example, that fans inwardly and downwardly with respect to the bowl-shaped body 481, that helps the o-ring 482 to hold onto a reduced shelf or floor 479 of the o-ring groove 458. The shelf of the o-ring groove 458 may have a reduced diameter (that is, does not extend all the way to the side wall of the solenoid bowl 230) in order to accommodate a side wall or connecting web 491 of the cap seal 480 extending from the o-ring seal portion 482. The o-ring portion 482 generally keeps the vent flow in interior annular pocket 493 (described further below) from leaking out of the solenoid bowl 230.

Figure 18:
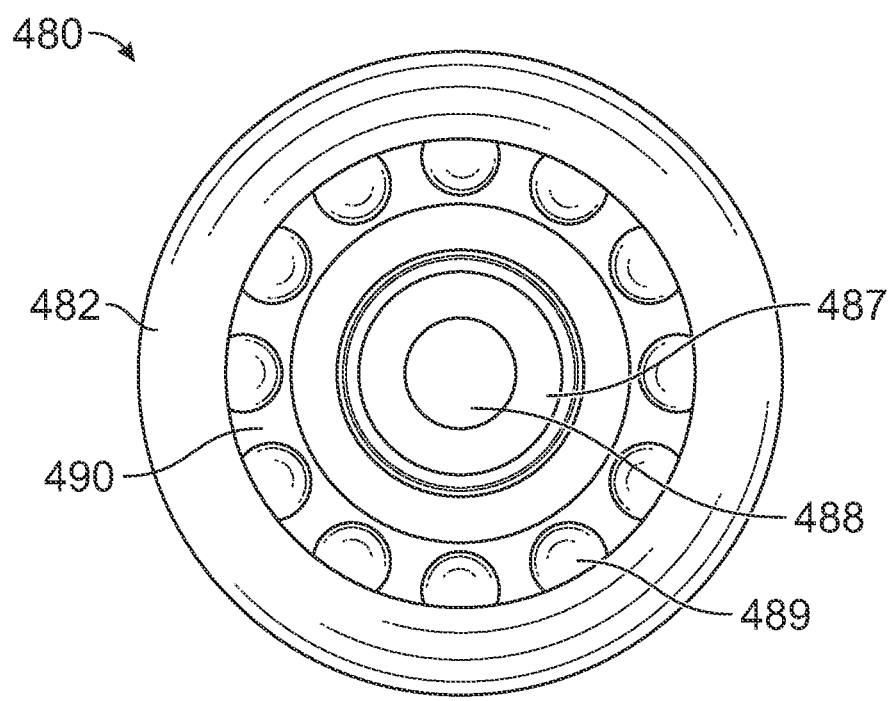
FIG. 18 is a top plan view of a cap seal of the reverse flow solenoid adapter of FIG. 6.

The cap seal body 481 is open on one end to receive the nose 465 of the adapter (e.g., in a cavity of the cap seal), and a side wall 491 of the body 481 extends between the upper o-ring seal portion 482 of the cap seal 480 to a bottom 496 of the cap seal 480. With reference to FIGS. 16-18, in the interior of the cap seal 480, the bottom 496 includes the central donut seal portion 485. The donut seal portion 485 includes a first portion 487 that extends into the interior of the cap seal 480 and a second portion 486 that extends outward from the bottom of the cap seal. The first portion 487 is received by the recess 452 of the adapter 450 while the second portion 486 sealingly engages the solenoid bowl 230, for instance, a valve member recess 236 of the solenoid bowl 230 (as illustrated in FIG. 10). The central opening 488 of the donut seal thus, as described above, passages fluid from the solenoid bowl 230 up into the adapter 450 without leakage or loss of pressure.

Figure 19:
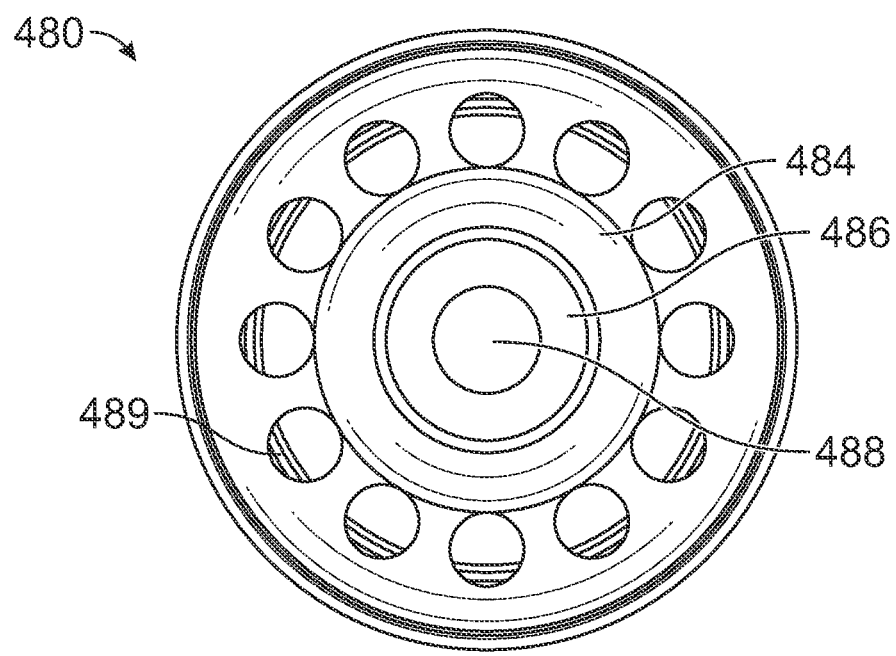
FIG. 19 is a bottom plan view of a cap seal of the reverse flow solenoid adapter of FIG. 6.

The donut seal 485 is flanked by an annular face seal portion 484 which provides further sealing between the adapter 450 and the solenoid bowl 230, for instance, contacting the central projection 453 of the adapter nose 465 on one side (as noted above), and contacting a central valve member 235 of the solenoid bowl 230 on the other side (as illustrated in FIG. 10). In the interior of the cap seal 480, a sloped and/or concaved floor 490 is disposed about the face seal portion 484 which defines a plurality of ports 489 that permit fluid flowing from the adapter 450 to flow back into the solenoid bowl 230. Preferably the plurality of ports 489 are circumferentially equally spaced on the sloped floor 490 about the donut seal 485, as illustrated in FIGS. 18-19. The number and dimensions of the ports are not particularly limited, as long as the configuration permits the fluid to flow out of the adapter and the cap seal with low resistance while maintaining sufficient material between the ports to structurally support the connection between the o-ring, the face seal, and the donut portions of the cap seal.

As illustrated in FIG. 10, in the vent passage flow path, fluid returns from the adapter 450 through the second outflow passage orifice 473 of the flow-reversing outflow passage 470. The fluid is dumped into an annular outflow passage or chamber 492 formed by the annular groove 451 of the adapter nose 465 and the sloped floor 490 of the cap seal 480. Thus, the annular outflow passage 492 provides sufficient volume for the high-pressure flow coming out of the adapter 450 so that it does not immediately hit the cap seal body 481 and restrict the flow through the adapter 450. That is, the cross-sectional area of the annular outflow passage 492 is sufficient to allow the high-pressure fluid to exit the adapter 450 into the solenoid bowl 230 without causing a system choke point. The fluid floods the annular outflow passage 492 and subsequently exits through any one or number of the ports 489. The annular outflow passage 492 and the multiple, equally spaced ports 489 enable the cap seal 480 to be installed without having to clock the cap seal 480 with respect to the adapter 450.

Upon exiting the ports 489 of the cap seal 480, the fluid is dumped into the forward flow solenoid bowl 230. The interface between the cap seal 480 and the solenoid bowl 230 forms an interior annular pocket 493 of the solenoid bowl 230, in which the high-pressure fluid collects before it flows out the radially disposed exit opening 234 of the forward flow solenoid bowl 230. The fluid finally exits the solenoid bowl 230 through the radially disposed exit opening 234 and travels through a downstream vent passage 225 to the outlet side of the valve. In this manner, a reverse flow solenoid adapter 450 permits use of a reverse flow solenoid with a forward flow solenoid bowl 230 to open and close a solenoid valve.

The material used for the cap seal 480 is typically an elastomer that has a low compression set and that is resistant to water as well as chemicals common to the irrigation industry. For example, the material may be nitrile rubber.

Figure 20:
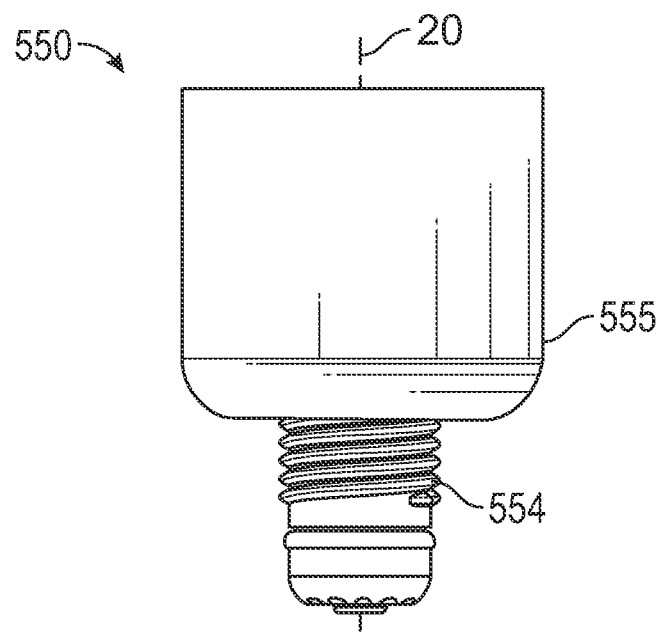
FIG. 20 is an elevational view of another embodiment of a reverse flow solenoid adapter.
Figure 21:
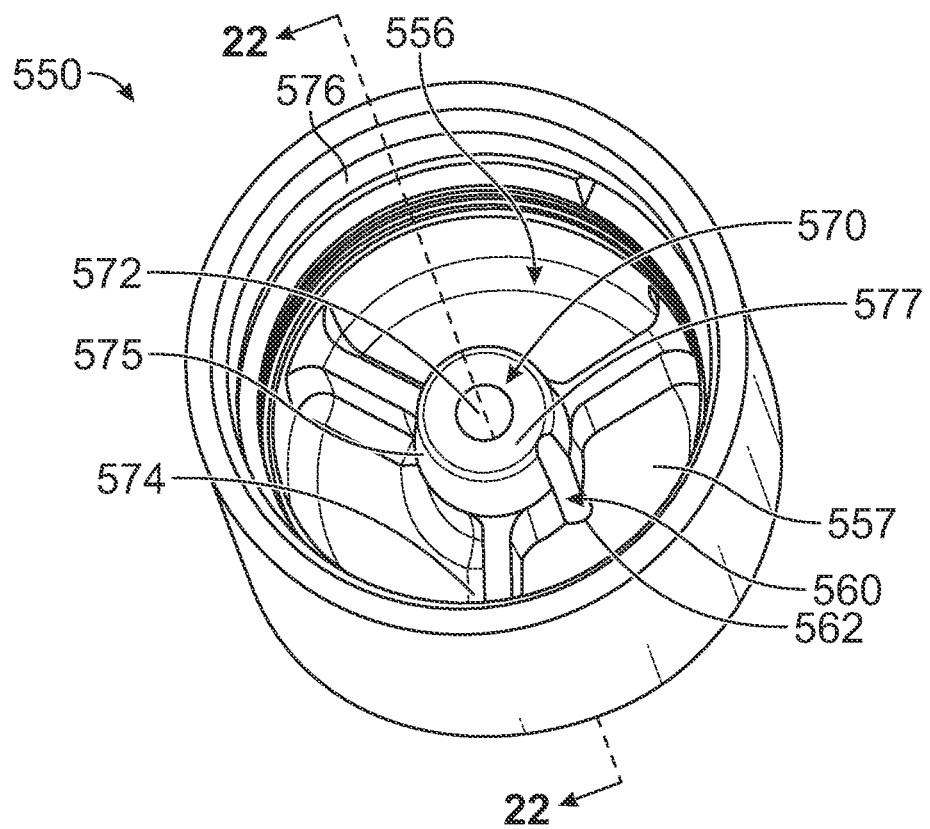
FIG. 21 is a top perspective view of the reverse flow solenoid adapter of FIG. 20.
Figure 22:
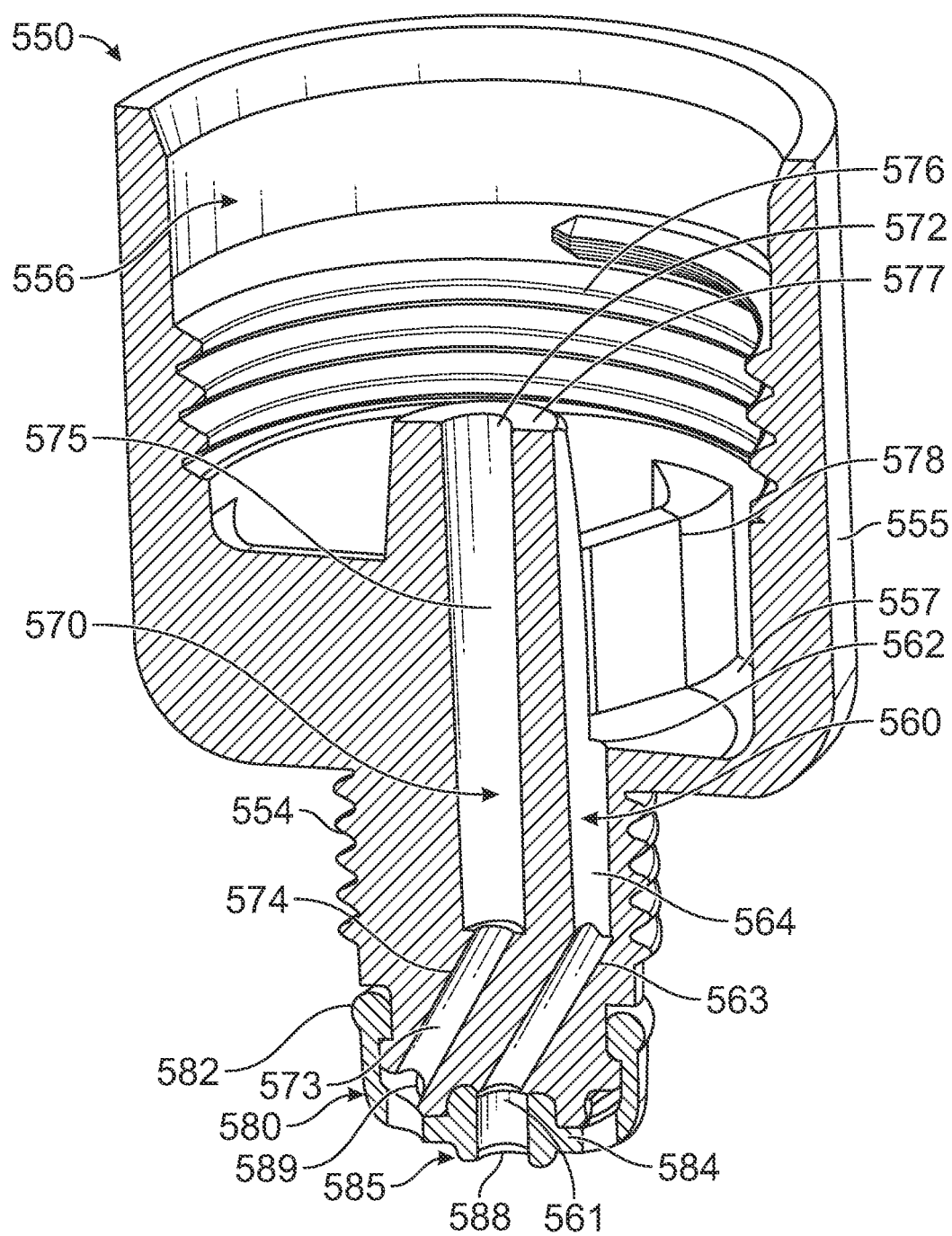
FIG. 22 is a perspective cross section view of the reverse flow solenoid adapter of FIG. 20 taken along line 22-22 of FIG. 21.

FIGS. 20-22 illustrate an alternative reverse flow solenoid adapter 550. The reverse flow solenoid adapter 550 functions in the same manner as the reverse flow solenoid adapter 450 described above and has a substantially similar configuration. However, the reverse flow solenoid adapter 550 includes some differences that enable it to be injection molded. The flow-reversing passages 560, 570 may have different configurations, such as uniform diameters or cross-sections, to facilitate use of form pins for molding the passages. More specifically, for example, the flow-reversing inflow or inlet passage 560 may include an angled portion or segment 563 that can be produced via an angled pin from the bottom of the adapter and a vertical portion or segment 564 that can be produced via a vertical pin from the cavity 576 of the adapter. Each portion may have a uniform cross-section that is selected to best optimize flow through the adapter. Further, the second inflow passage orifice 560 may be formed by inserting a vertical pin partially through an edge of the central protruding portion 575 of the outflow passage 570 before extending into the floor 557 of the cavity 556 to form the inflow passage 560.

The outflow or outlet passage 570 of the adapter 550, like the inflow passage 560, also includes an angled portion or segment 574 that can be produced via an angled pin from the bottom of the adapter and a vertical portion or segment 564 extending along the central axis 20 of the adapter 550 that can be produced via a vertical pin from the cavity 576 of the adapter. Each portion may have a uniform diameter and shape to facilitate injection molding.

Generally, the adapters disclosed herein (including reverse flow adapter 450, reverse flow adapter 550, and the forward flow adapter 650 described below) can be made from a number of different materials. An injection-molded adapter, for instance, can be made from any suitable injection moldable plastic. Nylon or PC/ABS (an alloy of polycarbonate and acrylonitrile butadiene styrene) are non-limiting examples. A 3D printed adapter, for instance, can be made from any suitable plastic or metal that is resistant to water and resistant to chemicals commonly used in irrigation. In a preferred embodiment, the material for a 3D printed adapter is nylon.

It is noted that the solenoid adapters described in detail above are reverse flow solenoid adapters which permit use of a reverse flow solenoid with a forward flow solenoid bowl. However, one skilled in the art would be able to apply the principles disclosed above and adjust the above-disclosed designs and structures to additionally provide a forward flow solenoid adapter. The forward flow solenoid adapter would permit use of a forward flow solenoid with a reverse flow solenoid bowl.

Figure 23:
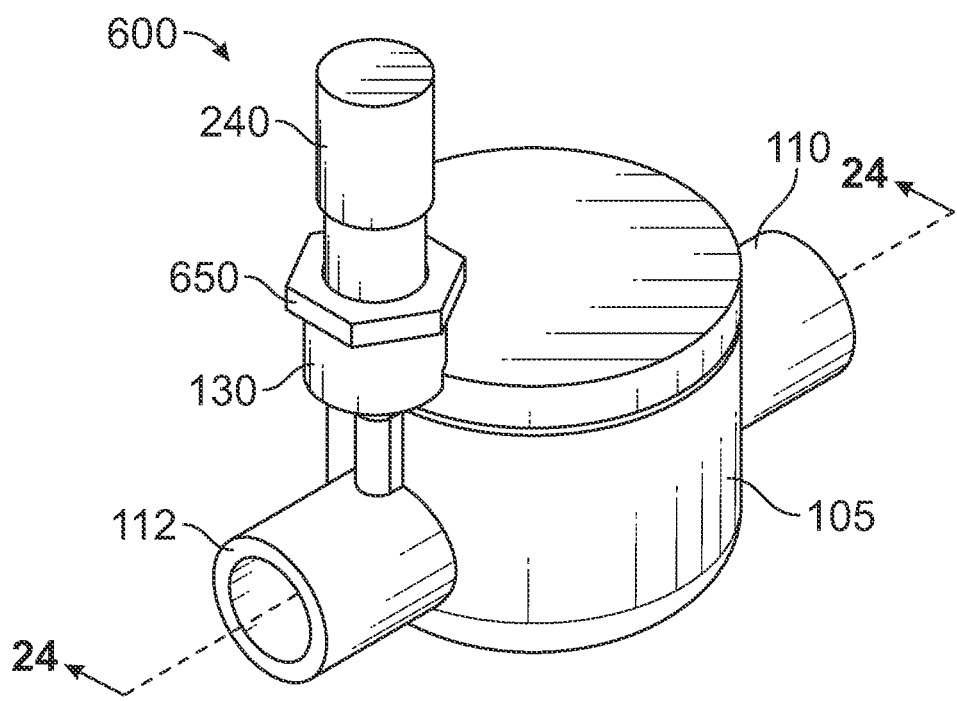
FIG. 23 is a perspective view of a solenoid valve having a reverse flow configuration accommodating a forward flow solenoid via a forward flow solenoid adapter.
Figure 24:
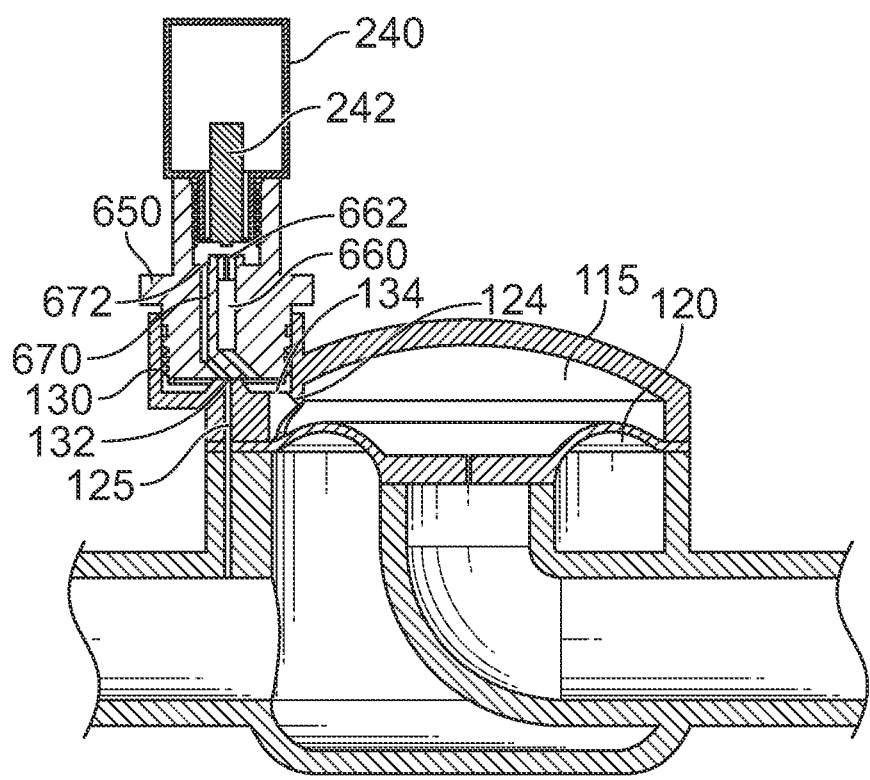
FIG. 24 is a cross section view of the solenoid valve of FIG. 23 taken along line 24-24.
Figure 25:
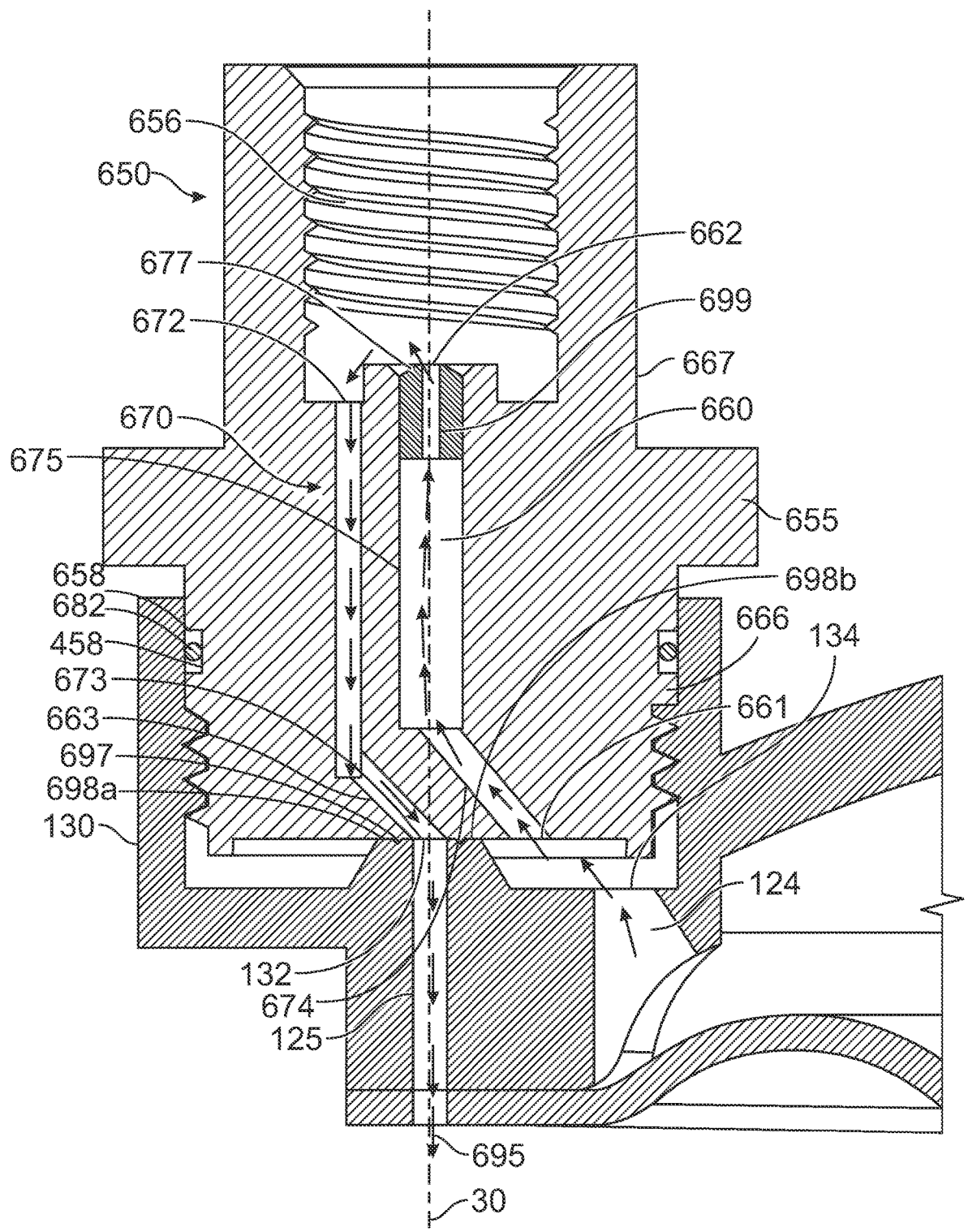
FIG. 25 is an enlarged portion of a cross section view of the solenoid valve of FIG. 23 taken along line 24-24 with the solenoid removed.

For example, FIGS. 23-26C illustrate a forward flow solenoid adapter 650. FIGS. 23-24 illustrate a solenoid valve 600 having a reverse flow solenoid bowl 130, a forward flow solenoid adapter 650, and a forward flow solenoid 240, while FIG. 25 illustrates an enlarged portion of the valve 600 with the forward flow solenoid 240 removed. The forward flow solenoid adapter 650 has a main body 655 including a lower portion 666 that is threaded into the reverse flow solenoid bowl 130 and an upper portion 667 with an open top for receiving the forward flow solenoid 240. The forward flow solenoid is threaded into a cavity or adapter solenoid chamber or bowl 656 which is hydraulically connected to the reverse flow solenoid bowl through flow-reversing passages 660, 670.

FIG. 25 illustrates the vent passage flow path 695 travelled by the high-pressure fluid through the reverse flow solenoid bowl 130 and through the ducting of the forward flow solenoid adapter 650 during operation of the valve 600. Generally, the high-pressure fluid travels a circuitous path from the reverse flow solenoid bowl 130 up through the adapter 650 to the adapter solenoid chamber 656 and back down toward the reverse flow solenoid bowl 130 again.

The flow-reversing passages 660, 670 have a similar structure and function to the flow-reversing passages of the reverse flow solenoid adapters 450 and 550 described above, though they have an opposite configuration. While the flow-reversing passages 460, 470, 560, 570 of the reverse flow adapters 450, 550 reverse the vent passage flow path between a forward flow solenoid bowl and a reverse flow solenoid, the flow-reversing passages 660, 670 of the forward flow adapter 650 reverse the vent passage flow path between a reverse flow solenoid bowl and a forward flow solenoid. Thus, the forward flow solenoid 240 can actuate a valve 600 having a reverse flow solenoid bowl 130.

The flow-reversing passages include a flow-reversing inflow or inlet passage 660 and a flow-reversing outflow or outlet passage 670. The flow-reversing inflow passage 660 extends from a radially disposed first inflow passage orifice 661 that, in use, receives fluid from the reverse flow solenoid bowl 130. Generally, fluid flows from pressure chamber vent passage 124 through a radially disposed entrance opening 134 of the reverse flow solenoid bowl 130 into the reverse flow solenoid bowl 130, and the inflow passage 660 subsequently ducts fluid from the reverse flow solenoid bowl 130 from the reverse flow configuration to a forward flow configuration as the fluid travels downstream to the adapter solenoid chamber 656. To do so, the inflow passage 660 includes a lower angled portion or segment 674 effective to shift or transition fluid within the reverse flow solenoid bowl 130, which has a flow path within the reverse flow solenoid bowl 130 that is radial of center, towards an opening 662 in the adapter solenoid chamber 656 that is axially central. The inflow passage 660 also includes an upper vertical portion or segment 675 that extends along the central axis 30 of the adapter 650 downstream of the angled portion 674. The central, vertical portion 675 of the inflow passage 660 leads to a centrally disposed second inflow passage orifice 662 that permits fluid to flow into the adapter solenoid chamber 656. At least a portion of the passage 660 adjacent the centrally disposed orifice 662 may protrude or project into the adapter solenoid chamber 656, bringing the centrally disposed orifice 662 into proximity with the axially central plunger of an installed solenoid.

Thus, fluid traveling from a radially outboard flow path within the reverse flow solenoid bowl 130 through the flow-reversing inflow passage 660 of the adapter 650 is transitioned into a forward flow configuration, entering the adapter solenoid chamber 656 via the centrally disposed orifice 662. In the manner typical of a forward flow solenoid bowl, however, the fluid can only enter the adapter solenoid chamber 656 when the axially central plunger of a solenoid is retracted to unseal the centrally disposed orifice 662.

During operation of the valve 600, the axially central plunger 242 of the solenoid 240, axially aligned with the centrally disposed orifice 662, selectively permits or blocks flow of fluid through the centrally disposed orifice 662, permitting or preventing fluid from passing into the adapter solenoid chamber 656. For instance, when the solenoid is in a deenergized state, a leading face of the plunger sealingly engages an exposed top annular surface or sealing surface 677 of the inflow passage 660 about the centrally disposed orifice 662 (illustrated best in FIG. 26A), the top annular surface 677 functioning as a valve seat. In this manner, the plunger may block the flow of fluid into the adapter solenoid chamber 456, inhibiting venting.

When the solenoid is energized, the plunger moves off the valve seat permitting fluid to flood into the adapter solenoid chamber 656. As in a typical forward flow solenoid bowl, the fluid is then vented. Fluid exits the adapter solenoid chamber 656 via the flow-reversing outflow passage 670. More specifically, the fluid enters the outflow passage 670 via a first outflow passage orifice 672 disposed radially on the floor of the adapter solenoid chamber 656. The outflow passage 670, like the inflow passage 660, includes at least one angled portion 663 effective to shift or transition fluid that passed through the radially disposed outflow passage orifice 672 towards the centrally disposed exit opening 132 of the reverse flow solenoid bowl 130. Upon return to the reverse flow solenoid bowl 130, the fluid then passes out the exit opening 132 into the downstream vent passage 125 on the outlet side of the valve 600, thus venting the pressure chamber and opening the valve.

As was the case with the reverse flow solenoid adapter 450, the flow-reversing passages and orifices of the forward flow solenoid adapter 650 may be adjusted to achieve an optimal maximum fluid flow that mitigates pressure loss due to resistance as the fluid passes through the bending paths of the adapter 650. In addition, the inflow passage 660 may include a narrower outlet portion 699 immediately upstream of the centrally disposed orifice 662 to reduce the size of the centrally disposed orifice 662 relative to the other portions of the inflow passage 660 to lessen the amount of water pressure exerted on the solenoid plunger from the inflow passage 660. The narrower outlet portion 699 may be formed via an insert, such as a stainless-steel insert, which increases the durability of the secondary valve seat by maintaining a constant size of the centrally disposed orifice 662 over time.

Further, the forward flow solenoid adapter 650 may be manufactured similarly to the reverse flow solenoid adapter. For instance, the main body 655 and flow-reversing passages 660, 670 of the forward flow solenoid adapter 650 may be formed integrally with one another and/or as a single piece. The forward flow solenoid adapter 650 illustrated herein, in particular, can be made, for example, via injection molding or 3D printing. The particular configurations and shapes of the passages and openings of the adapter 650 can be designed to optimize flow though the adapter 650.

Figure 26A:
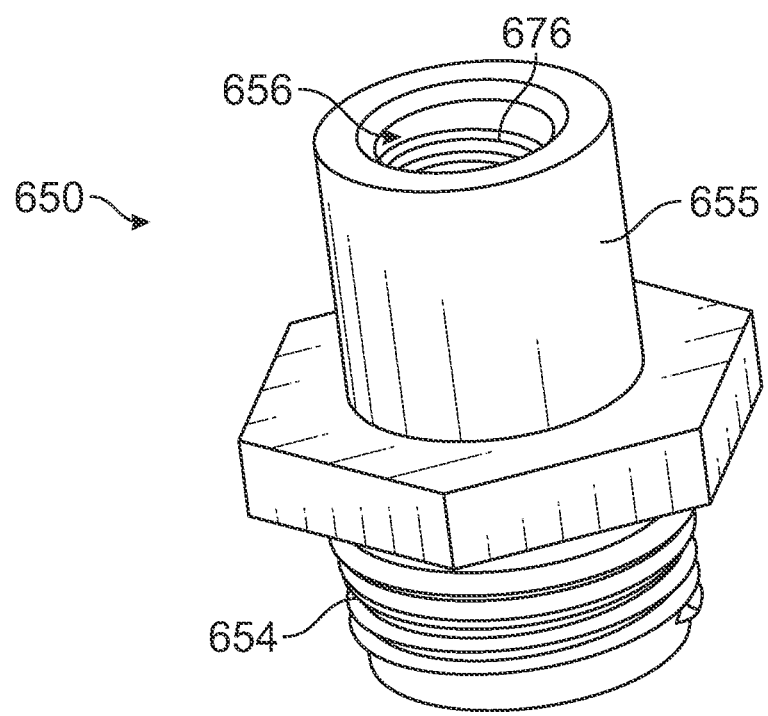
FIG. 26A is a perspective view of the forward flow solenoid adapter of FIG. 23.
Figure 26B:
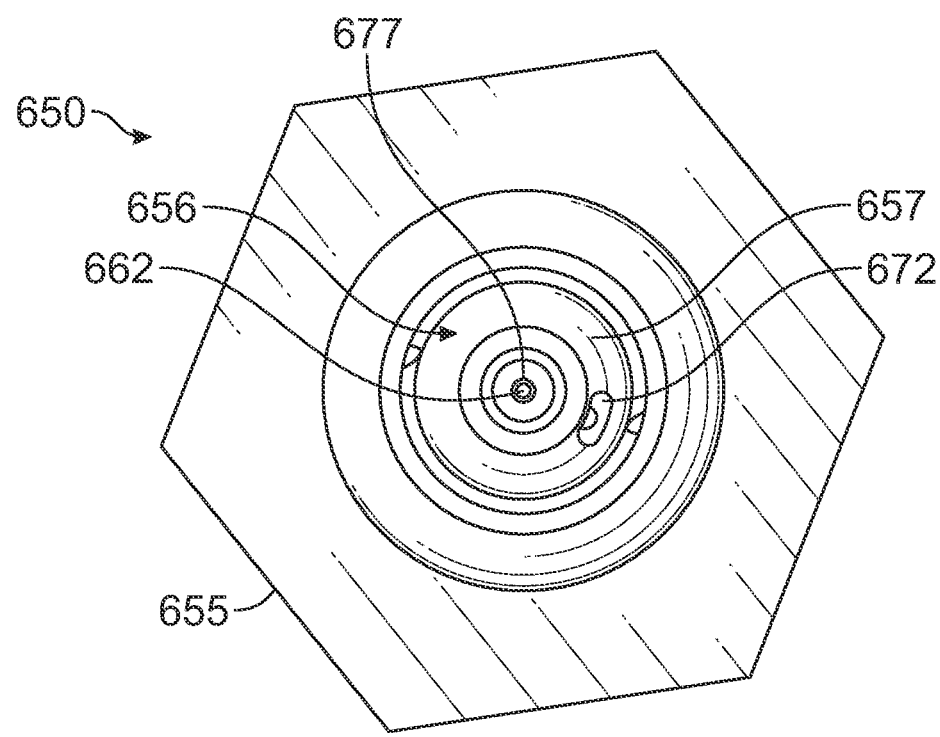
FIG. 26B is a top plan view of the forward flow solenoid adapter of FIG. 23.
Figure 26C:
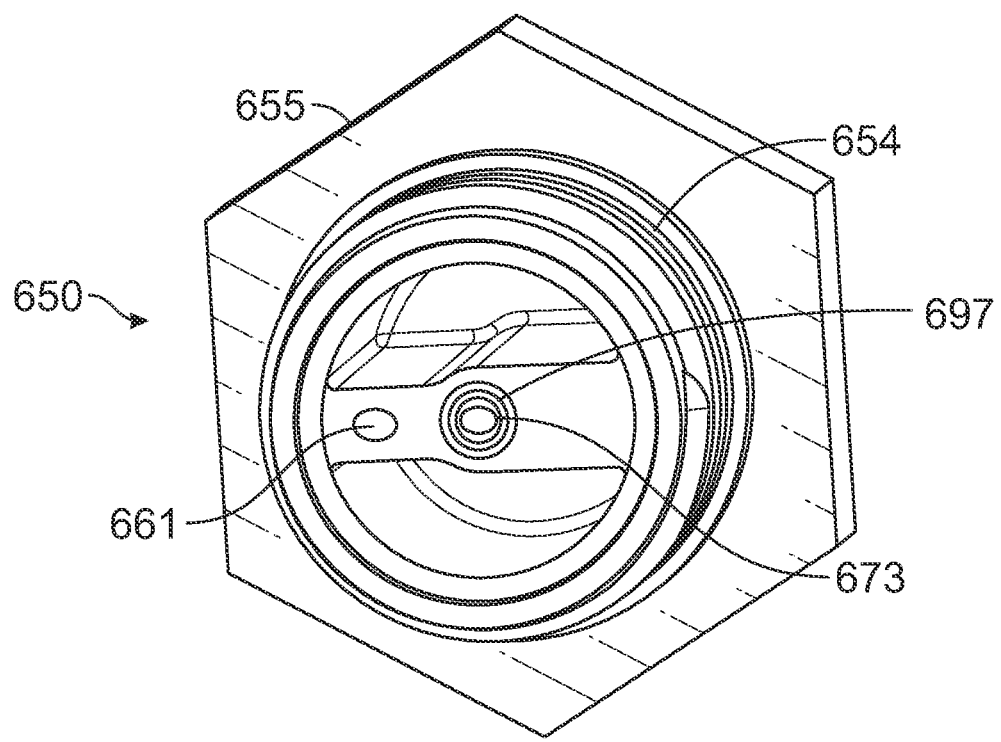
FIG. 26C is a bottom perspective view of the forward flow solenoid adapter of FIG. 23.

Further, one or more sealing elements may be provided to seal portions of the interface between the forward flow solenoid adapter 650 and the reverse flow solenoid bowl 230. For instance, FIGS. 25 and 26C illustrate that the forward flow adapter 650 may include an annular V-shaped projection 697 that extends from the adapter 650 about the second outflow passage orifice 673. When the adapter 650 is screwed into the solenoid bowl 230, the V-shaped projection 697 bites into a sealing surface 698b of a central conical mound 698a of the reverse flow solenoid bowl 230 so that fluid cannot leak out between the adapter 650 and the solenoid bowl 230 when fluid is communicated between the second outflow passage orifice 673 and the exit opening 132 of the reverse flow solenoid bowl 230. The forward flow solenoid adapter 650 may further be provided with an o-ring 682 positioned in an o-ring groove 658 of the adapter 650.

For convenience, illustrated items which are similar amongst different embodiments are identified in the figures using the same two-digit reference numeral in combination with a prefix "1", "2", "3", "4", "5", or "6" to distinguish one embodiment from the other. Thus, for example, the valve body 105 identified in FIGS. 1A-1B is identified as "205" in FIGS. 2A-2B (using the same two-digit reference numeral in combination with the prefix "2"), since it is similar to the valve body 105. Similarly, for example, the flow-reversing inflow passage 360 identified in FIG. 5 is identified as "460" in FIGS. 9-10, "560" in FIG. 22, and "660" in FIG. 25 since these items are similar to the flow-reversing inflow passage 360.

The matter set forth in the foregoing description and accompanying drawings is offered by way of example and illustration only and not as a limitation. While certain embodiments have been shown and described, it will be apparent to those skilled in the art that additions, changes, and modifications may be made without departing from the broader aspects of the technological contribution. The actual scope of the protection sought is intended to be defined in the following claims.

What is claimed is:

1. An adapter for a solenoid of a solenoid actuated valve comprising:

a first end sized to be received by a valve solenoid bowl, a second end including an adapter solenoid bowl sized to receive the solenoid, the solenoid being incompatible with the valve solenoid bowl, an inlet passage for communicating fluid from the valve solenoid bowl to the adapter solenoid bowl, wherein the inlet passage radially shifts fluid when fluid flows through the inlet passage, and an outlet passage for communicating fluid back to the valve solenoid bowl from the adapter solenoid bowl, wherein the inlet and outlet passages provide fluid communication between the valve solenoid bowl and the adapter solenoid bowl such that the adapter enables the solenoid to operate the solenoid actuated valve.

2. The adapter of claim 1, wherein the adapter includes a central longitudinal axis and the inlet passage and the outlet passage each include an angled segment for shifting fluid between a first path along the central longitudinal axis and a second path radially spaced from the central longitudinal axis.

3. The adapter of claim 1, wherein the inlet passage includes a first inlet orifice for fluid flowing into the first end of the adapter and a second inlet orifice for fluid flowing into the adapter solenoid bowl, wherein one of the first inlet orifice or the second inlet orifice is positioned on a central longitudinal axis of the adapter and the other of the first inlet orifice or the second inlet orifice is radially spaced from the central axis.

4. The adapter of claim 3, wherein the outlet passage includes a first outlet orifice for fluid exiting the adapter solenoid bowl, and a second outlet orifice for fluid exiting the first end of the adapter, wherein one of the first outlet orifice or the second outlet orifice is positioned on the central longitudinal axis of the adapter and the other of the first outlet orifice and the second outlet orifice is radially spaced from the central axis.

5. The adapter of claim 1, having a flow configuration wherein fluid enters the first end of the adapter through a first opening along a central longitudinal axis of the adapter and proceeds into the adapter solenoid bowl through a second opening radially spaced from the central axis and exits the adapter solenoid bowl through a third opening along the central axis and proceeds out of the first end of the adapter through a fourth opening radially spaced from the central axis.

6. The adapter of claim 5, further comprising a seal member affixed to the first end of the adapter for providing a sealing interface and fluid communication between the valve solenoid bowl and the first end of the adapter, the seal member including a central through-opening aligned with the first central opening of the adapter, the central through-opening formed by an inner seal portion of the seal member, the inner seal portion received in a central recess of the first end of the adapter formed by a projection extending from the first end.

7. The adapter of claim 6, wherein the seal member further includes a cavity for receiving the first end of the adapter and a bottom comprising a sloped floor, wherein the sloped floor of the seal member and the projection of the adapter form an annular passage for receiving fluid from the fourth radially spaced opening of the adapter.

8. The adapter of claim 7, wherein the sloped floor of the seal member includes a plurality of ports for fluid to exit the annular passage.

9. The adapter of claim 6, wherein the seal member is a single piece that further includes an outer seal portion to be disposed in an annular groove of the adapter.

10. The adapter of claim 1, having a flow configuration wherein fluid enters the first end of the adapter through a first opening radially spaced from a central longitudinal axis of the adapter and proceeds into the adapter solenoid bowl through a second opening along the central axis and exits the adapter solenoid bowl through a third opening radially spaced from the central axis and proceeds out of the first end of adapter through a fourth opening along the central axis.

11. The adapter of claim 1, further comprising a seal member affixed to the first end of the adapter for providing a sealing interface and fluid communication between the valve solenoid bowl and the first end of the adapter.

12. A valve comprising:
  a valve body having a valve inlet passage and a valve outlet passage separated by a valve seat;
  a diaphragm having a first side and a second side, the first side engaging and disengaging the valve seat for closing and opening the valve, respectively;
  a control chamber on the second side of the diaphragm, the control chamber effective to change the first side of the diaphragm between engaging and disengaging the valve seat;
  a valve solenoid bowl in fluid communication with the control chamber and the valve outlet and having a central longitudinal axis;
  a solenoid for permitting or preventing venting of the control chamber for opening or closing the valve, the solenoid being incompatible for direct use with the valve solenoid bowl; and
  an adapter for enabling use of the solenoid with the valve solenoid bowl, the adapter having a first end that is received by the valve solenoid bowl and a second end including an adapter solenoid bowl that receives the solenoid, wherein the valve solenoid bowl, solenoid, and adapter are substantially aligned along the central longitudinal axis,
  the adapter further including an inflow passage for communicating fluid from the valve solenoid bowl to the adapter solenoid bowl and an outflow passage for communicating fluid back to the valve solenoid bowl from the adapter solenoid bowl,
  wherein the inflow passage communicates fluid between a first orifice at the first end of the adapter and a second orifice at the adapter solenoid bowl, the first orifice and the second orifice being radially spaced from one another, and
  the inflow and outflow passages providing fluid communication between the valve solenoid bowl and the adapter solenoid bowl such that the adapter, in an operational state, enables the solenoid to open and close the valve.

13. The valve of claim 12, wherein the valve solenoid bowl comprises a central opening positioned along the central axis for fluid flowing into the valve solenoid bowl from the control chamber and a radial opening radially spaced from the central axis for fluid exiting the valve solenoid bowl; and
  the second orifice at the adapter solenoid bowl is radially spaced from the central axis for fluid entering the adapter solenoid bowl from the inflow passage, and a third orifice at the adapter solenoid bowl is positioned along the central axis for fluid exiting the adapter solenoid bowl into the outflow passage.

14. The valve of claim 13, wherein the first end of the adapter includes the first orifice positioned along the central axis for fluid entering the inflow passage from the valve solenoid bowl, and a fourth orifice spaced from the central axis for fluid exiting the outflow passage to return to the valve solenoid bowl.

15. The valve of claim 13, wherein the third orifice of the adapter solenoid bowl is engaged by a plunger of the solenoid positioned along the central axis in an operational state of the valve such that fluid exits the adapter solenoid bowl when the plunger of the solenoid uncovers the third orifice and fluid remains in the adapter solenoid bowl when the plunger of the solenoid covers the third orifice.

16. The valve of claim 14, wherein the outflow passage includes a first segment extending vertically along the central axis from the third orifice of the adapter solenoid bowl and a second segment extending at an angle from the first segment to the fourth orifice at the first end of the adapter.

17. The valve of claim 12, wherein the valve solenoid bowl comprises a radial opening radially spaced from the central axis for fluid flowing into the valve solenoid bowl from the control chamber and a central opening positioned along the central axis for fluid flowing out of the valve solenoid bowl or the adapter to downstream of the valve; and
  the second orifice at the adapter solenoid bowl is positioned along the central axis for fluid entering the adapter solenoid bowl from the inflow passage, and a third orifice at the adapter solenoid bowl is radially spaced from the central axis for fluid exiting the adapter solenoid bowl into the outflow passage.

18. The valve of claim 17, wherein the first end of the adapter includes the first orifice radially spaced from the central axis for fluid entering the inflow passage from the valve solenoid bowl and a fourth orifice positioned along the central axis for fluid exiting the outflow passage.

19. The valve of claim 18, wherein the inflow passage includes a first segment extending at an angle from the first orifice of the first end of the adapter and a second segment extending vertically along the central axis from the first segment to the second orifice of the adapter solenoid bowl.

20. The valve of claim 17, wherein the second orifice of the adapter solenoid bowl is engaged by a plunger of the solenoid positioned along the central axis in an operational state of the valve such that fluid enters the adapter solenoid bowl when the plunger uncovers the second orifice and fluid is prevented from entering the adapter solenoid bowl when the plunger covers the second orifice.

21. The valve of claim 12, further comprising a seal affixed to the first end of the adapter for providing a sealing interface between the valve solenoid bowl and the adapter.

22. A method for adapting a solenoid to a valve solenoid bowl of a solenoid actuated valve, the method comprising:
  providing the adapter of claim 1;
  threading the first end of the adapter into a valve solenoid bowl; and
  threading the solenoid, into the adapter solenoid bowl, wherein the solenoid is not configured for direct use with the valve solenoid bowl.

* * * * *

UNITED STATES PATENT AND TRADEMARK OFFICE
CERTIFICATE OF CORRECTION

PATENT NO. : 11,971,114 B1
APPLICATION NO. : 18/151314
DATED : April 30, 2024
INVENTOR(S) : Kevin Mark Irwin, Kevin James Markley and Nicholas James Watts It is certified that error appears in the above-identified patent and that said Letters Patent is hereby corrected as shown below:

In the Claims

Column 20, Line 58, Claim 22, delete "solenoid," and insert --solenoid-- therefor.

Signed and Sealed this
Ninth Day of July, 2024

Katherine Kelly Vidal
Director of the United States Patent and Trademark Office